US006591322B1

(12) United States Patent
Ervin et al.

(10) Patent No.: US 6,591,322 B1
(45) Date of Patent: Jul. 8, 2003

(54) METHOD AND APPARATUS FOR CONNECTING SINGLE MASTER DEVICES TO A MULTIMASTER WIRED-AND BUS ENVIRONMENT

(75) Inventors: Joseph J. Ervin, Stow, MA (US); Jorge E. Lach, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 416 days.

(21) Appl. No.: 09/630,099

(22) Filed: Aug. 1, 2000

(51) Int. Cl.$^7$ .......................... G06F 13/00; G06F 13/36
(52) U.S. Cl. ...................... 710/110; 710/314; 711/201
(58) Field of Search ................................ 710/305, 306, 710/316; 713/300, 601; 709/231; 340/825.5, 825.52; 368/156

(56) References Cited

U.S. PATENT DOCUMENTS

| | | | | |
|---|---|---|---|---|
| 4,430,702 A | * | 2/1984 | Schiebe et al. | 710/305 |
| 4,574,284 A | * | 3/1986 | Feldman et al. | 340/825.52 |
| 5,376,928 A | * | 12/1994 | Testin | 340/825.5 |
| 5,442,775 A | * | 8/1995 | Whitted et al. | 713/601 |
| 5,461,652 A | * | 10/1995 | Hongo | 368/156 |
| 5,758,085 A | * | 5/1998 | Kouoheris et al. | 709/231 |
| 5,892,933 A | * | 4/1999 | Voltz | 710/316 |
| 6,098,174 A | * | 8/2000 | Baron et al. | 713/300 |
| 6,205,504 B1 | * | 3/2001 | Faust et al. | 710/305 |
| 6,477,609 B1 | * | 11/2002 | Reiss et al. | 710/306 |

FOREIGN PATENT DOCUMENTS

WO    WO 98/34376 A2    8/1998

OTHER PUBLICATIONS

IBM Technical Disclosure Bulletin, Bus Controller for Color Monitor, May 1, 1990, IBM TDB–ACC–NO: NN900553, vol. 32, No. 12, pp. 53–56.*

Micro Computer Control Co., "iPort/Al, RS–232 to I$^2$ C Host Adapter W/ASCII Interface, Model MICC–202, V2.00, User's Guide", 'Online', 1998, Hopewell, NJ, XP002186109 <URL:http://www.mcc–us.com/202ug.htm>.

* cited by examiner

*Primary Examiner*—Mark H. Rinehart
*Assistant Examiner*—Christopher E. Lee
(74) *Attorney, Agent, or Firm*—Kudirka & Jobse, LLP

(57) ABSTRACT

A "firewall" apparatus is placed between a single bus master device and a multimaster I$^2$C bus system. The firewall apparatus transforms all multimaster bus errors into simple NAK errors and isolates the single bus master from the multimaster bus. Therefore the single bus master needs only to retry transactions that receive unexpected NAKs and all complex multimaster issues, such as bus collisions, transaction termination and bus recovery, associated with the actual error that occurred on the multimaster bus are handled by the firewall apparatus. In accordance with one embodiment, when the single bus master attempts to launch a transaction at a time when the multimaster I$^2$C bus is busy, the firewall apparatus absorbs the address driven by the single bus master and then stalls the transaction until the firewall apparatus is able to successfully acquire and drive the address on the multimaster bus. The firewall apparatus is implemented in a preferred embodiment by a programmed microcontroller.

26 Claims, 15 Drawing Sheets

METHOD AND APPARATUS FOR CONNECTING SINGLE MASTER DEVICES TO A MULTIMASTER WIRED-AND BUS ENVIRONMENT

FIELD OF THE INVENTION

This invention relates to busses using a wired-AND protocol and, more particularly, to methods and apparatus for connecting devices in a bus system having multiple bus masters.

BACKGROUND OF THE INVENTION

The I²C bus system is an electronic bus for carrying commands and data between compatible devices connected to the bus. The system was developed and marketed by Philips Semiconductor Corporation and is described in detail in the I²C Specification, revision 2.0, Philips Semiconductor Corporation 1995, which specification is hereby incorporated by reference in its entirety. In the I²C bus system, two wires, called a serial data (SDA) line and serial clock (SCL) line, carry information between the devices connected to the bus. Both the SDA and SCL lines are bi-directional lines, connected to a positive supply voltage via pull-up resistors as shown in FIG. 1 to form a "wired-AND" configuration. For example, in the bus configuration 100 illustrated in FIG. 1, the SDA line 108 and the SCL line 110 are connected to the $V_{DD}$ supply line 102 by pull-up resistors 104 and 106, respectively. Other busses which use a similar protocol include the SMBus and Access. bus. Collectively, this type of bus system will be termed a "wired-AND" bus system. The remainder of the discussion will focus on the I²C bus system with the understanding that the discussion applies to these other bus systems as well.

When the bus 101 is free, both the SDA line 108 and the SCL line 110 are pulled to a "HIGH" state by the resistors 104 and 106. The output stages of devices connected to the bus must have an open-drain or open-collector in order to form the wired-AND configuration. Two devices 112 and 114 are shown schematically in FIG. 1. Device 112 has a clock output stage which includes output transistor 116 which is connected across the SCL line 110 and ground 118. When a signal on the gate 117 of transistor 116 turns the transistor on, it pulls the SCL line 110 "LOW." Clock signals on the SCL line 110 can be detected by means of buffer 120 whose output forms the "clock in" line 122.

Similarly, device 112 has a data output stage which includes output transistor 124 which is connected across the SDA line 108 and ground 126. When a signal on the gate 123 of transistor 124 turns the transistor on, it pulls the SDA line 108 "LOW." Data signals on the SDA line 108 can be detected by means of buffer 128 whose output forms the "data in" line 130. Device 114 also has a clock output transistor 132 and clock input buffer 134 and a data output transistor 136 and data input buffer 138 for communication with the SDA and SCL lines, 108 and 110.

Devices on the bus communicate by periodically pulling the SDA and SCL lines 108 and 110 LOW-producing data and clock pulses on the lines 108 and 110. In accordance with the I²C protocol, the data on the SDA line 108 must be stable when the clock line SCL 110 is HIGH. Thus, the HIGH or LOW state of the data line 108 can only change when the clock line 110 is LOW. Two unique situations arise, which situations are defined as START and STOP conditions. In particular, a HIGH to LOW transition on the SDA line 108 while the SCL line 110 is HIGH is defined as a START condition. A LOW to HIGH transition on the SDA line 108 while the SCL line 110 is HIGH is defined as a STOP condition.

Each device 112, 114 on the bus 101 has a unique address and can operate as either a data transmitter or a data receiver, depending on the function of the device. For example, an LCD driver is always a data receiver, whereas a memory can both receive and transmit data. In addition to being transmitters and receivers, devices can also be bus masters or slaves when performing data transfers. A bus master is the device that initiates a data transfer on the bus, generates the clock signals required for that transfer and terminates that data transfer. During this transfer, any other device to which data is sent, or from which data is received, is considered a slave. The bus master may transmit data to a slave or receive data from a slave. In both cases, the clock signals are generated by the bus master. Bus master and slave relationships are not permanent and depend on which device initiated the data transfer at a given time.

More than one bus master device can be connected to bus 101. Bus implementations with exactly one device capable of acting as a master are called single-master busses, while those with two or more devices capable of acting as bus masters are called multimaster busses. In a single-master bus system, the I²C protocol is very straightforward, with every transaction consisting of a START condition followed by one or more address and data phases, followed by a STOP condition. Thus, the START and STOP conditions frame all activity on the bus and hence define the duration during which the bus is busy.

In a single-master I²C bus, the only interesting error scenario that can present itself occurs when a slave device responds to an address or data phase with a negative-acknowledgement (NAK) response. A NAK response is represented as a HIGH signal level on the SDA line 108 during the acknowledge bit time, which is defined as the ninth clock pulse of any address or data phase. Since the I²C bus is a wired-AND configuration, a NAK response is equivalent to no response from a slave device. In the case of a NAK on an address phase, this may indicate that the slave device is busy and unable to accept I²C transactions at this time, that it is non-functional or simply missing.

Because NAK conditions happen only at well-defined points in a transaction, and because the interpretation of a NAK is straightforward, the response is not ambiguous. Most often, the bus master software may simply decide to retry a transaction that receives a NAK. The important observation is that NAK errors do not threaten the correct operation of the I²C bus itself; they affect only higher level protocol that is typically implemented in software.

Multimaster I²C bus implementations are dramatically more complex. The I²C protocol is essentially a carrier-sense multiple access with collision detection (CSMA/CD) scheme, which functions like an Ethernet system. However, unlike an Ethernet system, the I²C protocol lacks the higher layers of communication protocol that transform the Ethernet system into a reliable channel. As such, a large burden is placed on a multimaster I²C device. At every point in an I²C transmission, a bus master must be able to detect collisions with other bus masters and recover gracefully.

Some of these collision scenarios are particularly troublesome. For example, as described in the aforementioned I²C Specification, "arbitration" is the mechanism by which multiple bus master devices can drive the I²C bus simultaneously without causing data corruption. The basic arbitration mechanism relies on the open-collector nature of the bus; when two or more masters drive an address or data bit on the SDA line 108, a LOW value driven by one or more bus masters will always win out over a HIGH value produced by other bus masters. Thus, any bus master attempting to drive a HIGH value during a bit time (by not driving the SDA line 108 LOW and allowing the pull-up resistor 104 to keep the line HIGH), but sensing a LOW value during the same bit time, will recognize that a collision has occurred with another master driving a LOW value and relinquish the bus. However, if multiple bus masters are driving the same sequences of bits, then no collision will be detected until the bit sequences differ. Thus, it is possible that a bus master will detect a collision between itself and another master at some arbitrarily late point in a transaction, or even not at all.

Loss of arbitration is the simplest error type to handle from a protocol perspective because it automatically forces the losing bus master off the bus, as defined in the aforementioned $I^2C$ specification. In general, the bus master driving the numerically lowest message (address or data) will retain the bus, while those driving numerically higher bit sequences, i.e. with more 1's will lose arbitration and be forced to retry their transactions after the current transaction completes.

The arbitration mechanism is defined in the $I^2C$ specification only for bus masters that collide while transmitting address and/or data bits. Since the bus masters are all in synchrony preceding the detection of the collision, the correct handling of the situation is straightforward, and the state of the bus (busy or idle) is well understood. Specifically, the bus is busy with the winning master(s) proceeding with the transaction. However, a collision between two masters where one is driving a data bit and the other is driving a START or STOP condition is, by contrast, not well defined by the $I^2C$ specification regarding how it should be handled.

This latter type of bus collision is more complex than a simple loss of arbitration. In this collision type, one bus master is transmitting or receiving a "1" bit, represented as a HIGH value on the SDA line 108, when another bus master drives the SDA line 108 LOW in the middle of the bit. This START or STOP condition is "asynchronous" from the perspective of the bus master driving the data bit, because START and STOP conditions are allowed by definition only between address and data bytes, not on arbitrary bit boundaries. The $I^2C$ specification is unclear as to whether the bus master that detected this START/STOP condition should automatically stop driving the bus and record a loss of arbitration. Typically, this type of error is detected in hardware and reported to software as distinct from a normal loss of arbitration. In addition, when detected by a master while receiving bits, this type of error typically does not cause a master to stop driving the bus. Thus, when the error occurs, multiple masters are still driving the bus, but the START or STOP condition has abruptly truncated the transaction previously in progress. This error can occur if two or more bus masters drive identical transactions for some time, and then one of the masters issues a STOP or repeated START while the other attempts to continue the transaction with more data bytes.

This error can also indicate a much more serious scenario, which is that at least one master has become unsynchronized with the state of the bus (idle or busy) and has performed a transaction on top of one already in progress. This error can occur if noise has been introduced on the bus which has caused the SDA line 108 to experience a transient in the middle of a bit. Since the $I^2C$ bus system is an open collector bus with relatively weak pull-ups, and since some systems allow $I^2C$ devices to be "hot-plugged" onto the bus, such transients may occur.

The handling of this error is somewhat complex in that a bus master detecting this situation might retain ownership of the bus. In this case, the bus master must relinquish mastership of the bus either synchronously by driving a STOP condition, or by somehow resetting or reinitializing its $I^2C$ interface. In practice, it is unclear whether any bus master will be left driving a transaction. If the previous transaction in progress was aborted by all bus masters, then it is possible for the bus to become "hung", meaning that all bus masters having seen a START most recently (as opposed to a STOP), are waiting for someone to drive a STOP before they will attempt to reacquire the bus. Recovery from this state involves timeout timers and software specific to the $I^2C$ master's hardware implementation.

The complexity associated with multimaster $I^2C$ affects both the hardware implementation of the bus master itself, as well as the software driver that works in conjunction with the hardware to perform well-formed $I^2C$ transactions. The added software complexity of multimaster $I^2C$ over single-master $I^2C$ takes the form of sophisticated error handling and bus recovery procedures. Furthermore, there are no published standards similar to the Ethernet system which specify how various protocol violations should be handled, or how higher level protocol layers should be used to add reliability to an unreliable $I^2C$ bus. As a result, a multimaster $I^2C$ bus system is an uncertain environment, with the total reliability of the bus only as good as the quality of the poorest bus master in the system. In addition, because the $I^2C$ bus system is perceived to be "a simple, two-wire serial bus", testing and verification of a bus master implementation's multimaster hardware support is frequently not as thorough as needed, resulting in latent bugs. In many cases, these bugs cause data corruption and have no software workaround.

Therefore, there is a need for apparatus that could be used to construct a reliable multimaster $I^2C$ bus system.

SUMMARY OF THE INVENTION

In accordance with one illustrative aspect of the invention, "firewall" apparatus is placed between a single bus master device and a multimaster $I^2C$ bus system. The firewall apparatus transforms all multimaster bus errors into simple NAK errors. Thus, a master that is isolated from the multimaster bus by the inventive firewall apparatus needs only to retry transactions that receive unexpected NAKs. All the complex multimaster issues, such as collision handling, transaction termination and bus recovery, associated with the actual error that occurred on the multimaster bus are handled by the firewall apparatus.

In accordance with one embodiment, when the master device on the single-master side of the firewall attempts to launch a transaction at a time when the multimaster $I^2C$ bus is busy, the firewall apparatus absorbs the address driven by the single bus master and then stalls the transaction until the firewall apparatus is able to successfully acquire and drive the address on the multimaster bus.

In accordance with another embodiment, the firewall apparatus stalls the single bus master transaction by controlling the SCL clock line and driving it low.

In accordance with another embodiment, when the master device on the single-master side of the firewall initiates a transaction, the firewall apparatus will automatically attempt to acquire the multimaster bus a predetermined number of times, thereby relieving the master device from attending to collisions and loss of arbitration which occur on the multimaster bus.

In accordance with yet another embodiment, the firewall apparatus is implemented by a programmed microprocessor which is controlled by a state machine program. In this embodiment, a START condition generated by the single bus master is detected by connecting the SDA line to an interrupt port on the microprocessor and running an interrupt service routine in response to an interrupt to detect that START condition.

In still another embodiment, the firewall software dynamically alters the operating frequency of the microcontroller depending on whether the microprocessor is communicating with the single master bus or the multimaster bus in order to meet timing requirements.

BRIEF DESCRIPTION OF THE DRAWINGS

The above and further advantages of the invention may be better understood by referring to the following description in conjunction with the accompanying drawings in which.

DETAILED DESCRIPTION

The invention concerns a "firewall" apparatus and method that buffers $I^2C$ transactions generated by a bus master and retransmits the transactions on a multimaster bus segment. The term "firewall" refers to the fact that the inventive apparatus is an asymmetric bus bridge. Thus, it operates in a fashion similar to an Internet firewall that allows transparent access from a corporate intranet to the external Internet, while blocking Internet traffic from entering the corporate intranet. Similarly, the inventive apparatus possesses two $I^2C$ ports, hereafter called "port-A" and "port-B", and functions to pass $I^2C$ traffic transparently from port-A to port-B, but not vice versa. The term "port-A master" is used to refer to the master device connect to port-A on the private $I^2C$ segment.

Figure 2:
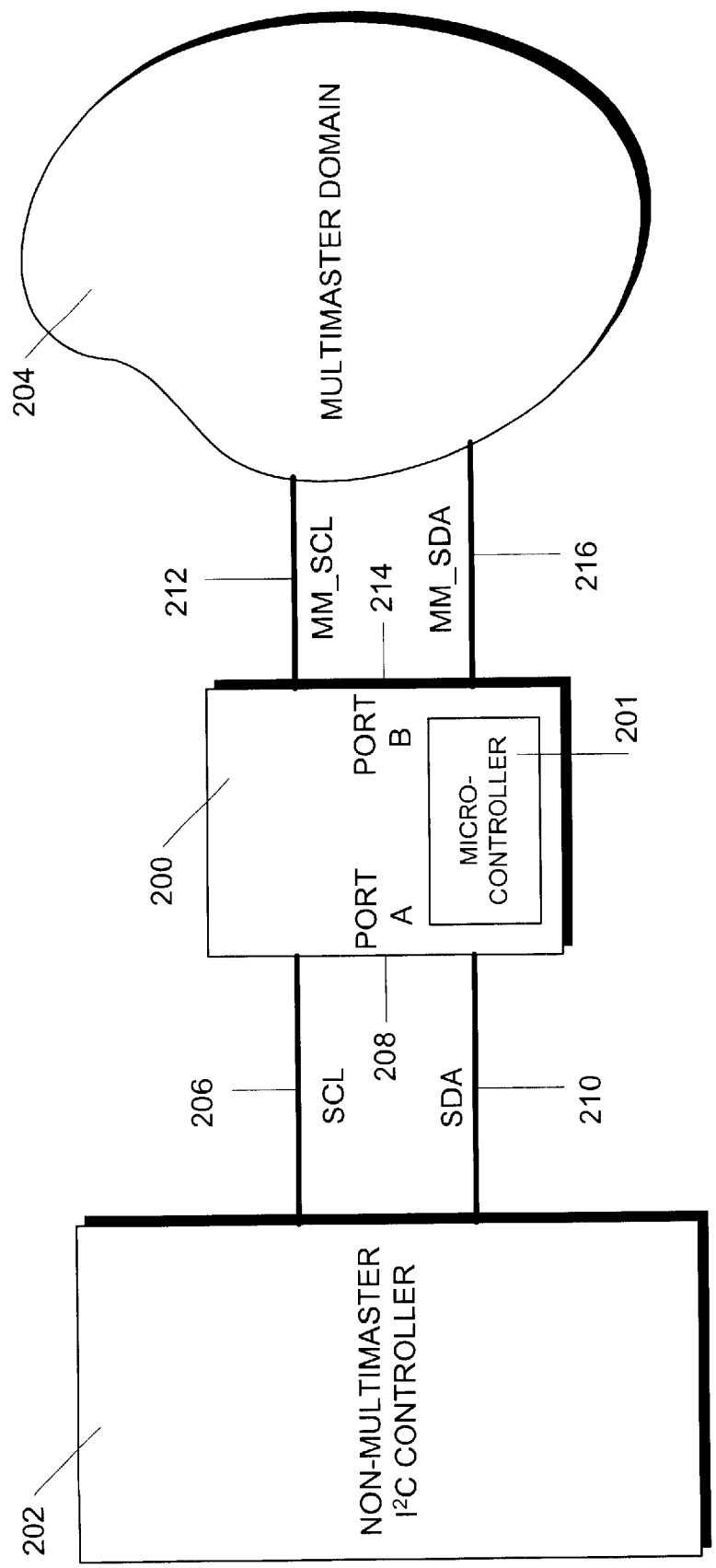
FIG. 2 is a block schematic diagram of the inventive firewall apparatus connected between a single master $I^2C$ device and a multimaster $I^2C$ domain.

The intended use of the firewall apparatus is shown in FIG. 2. The firewall apparatus 200 sits between a non-multimaster $I^2C$ controller 202 and the rest of the multimaster $I^2C$ domain 204. The firewall apparatus 200 has two port interfaces: port A 208 and port B 214. As a firewall, the port-A interface 208 is slave-only and serves only to receive transactions from the port-A master 202 via the SCL and SDA lines 206 and 210. The port-B interface 214 is master-only and is fully multimaster-capable and drives the MM_SCL and MM_SDA lines 212 and 216. In the preferred embodiment, the firewall apparatus 200 does not allow masters in the multimaster domain 204 to target the port-A master 202 as a slave, although in other embodiments this capability could be easily added.

In the configuration of FIG. 2, the firewall apparatus 200 exists as the only slave device on the private $I^2C$ segment comprising lines SCL and SDA, 206 and 210 connected between port-A 208 and the device 202. This configuration is necessary because, in the preferred embodiment, the firewall apparatus 200 does not perform any address filtering, such as would typically be done by, for example, an Ethernet bridge. Rather, the firewall apparatus will pass any addresses it receives at port-A 208 to the multimaster bus 212, 216 connected to port-B 214. Because the port-B bus 212, 216 is master-only, it blocks all activity in the multimaster domain 204 from reaching the port-A master 202. However, such address filtering could easily be implemented for applications that require it, using a RAM array internal to the firewall controller.

As such, when attempting to initiate a new transaction, the port-A master 202 never sees the private A-side $I^2C$ segment 206, 210 as "busy." Similarly, the inventive firewall apparatus filters out any protocol violations that may occur on the port-B multimaster bus 212, 216, presenting the port-A master 202 with valid $I^2C$ protocol in all cases. In a preferred embodiment, the firewall apparatus 200 translates all types of errors on the port-B multimaster bus 212, 216 into NAKs on the port-A bus 206, 210. In accordance with the principles of the invention, by turning all multimaster-related $I^2C$ errors appearing at port-B 214 into NAK errors appearing at port-A 208, the port-A master 202 does not need to detect and handle any of the troublesome multimaster $I^2C$ error scenarios described previously. Therefore, the inventive firewall apparatus allows any non-multimaster-capable $I^2C$ controller to be connected to a multimaster bus, and to operate correctly on the multimaster bus without the need for multimaster-aware hardware or software.

For example, a common method for constructing an $I^2C$ controller is to use a "bit-bang" driver which stimulates two open-collector General Purpose I/O (GPIO) ports for use as an $I^2C$ controller. In the PC industry, software to do exactly this, via the standard bi-directional parallel port, has existed for years. Since this interface has no hardware $I^2C$ support for START/STOP detection or arbitration and is driven at software speeds, it is generally assumed that such a port could never be made multimaster capable. With the present invention, this is now possible. The software driver need only know the very basics of single-master $I^2C$ operation.

Figure 1:
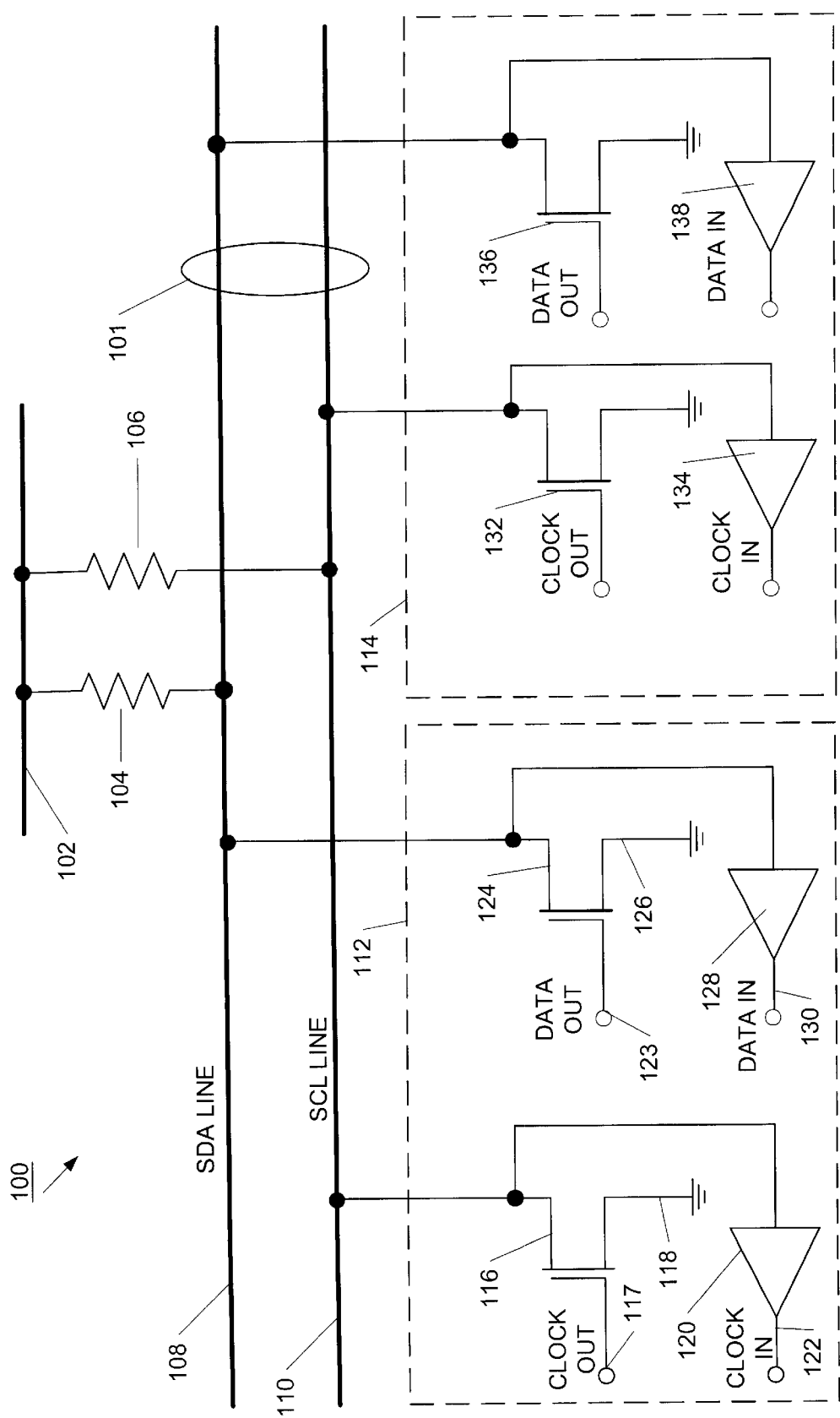
FIG. 1 is a schematic electrical diagram of the conventional $I^2C$ bus system illustrating the manner of driving information onto the bus system and receiving information from the bus system.

As previously mentioned, the two wires that comprise the I²C bus, the SCL and SDA lines 206 and 210, operate with open collector devices. This means that devices on the I²C bus are able only-to either actively drive these busses into a LOW state, or else release the busses and allow the pull-up resistors (FIG. 1, 104 and 106) connected to these busses to pull them into a HIGH state. Thus, if any device drives a LOW signal onto a bus, then the bus will be LOW, and conversely, a bus will only become HIGH when all devices have released it and allowed the pull-up resistor to pull the bus HIGH.

When applied to the SCL line 206 this behavior can be used as a clock synchronization mechanism, which is discussed in the aforementioned I²C-Bus specification as a means for devices to slow down, or temporarily stall, a transaction in progress. For example, the following is an excerpt from section 8.3 of the I²C Specification:

"In addition to being used during the arbitration procedure, the clock synchronization mechanism can be used to enable receivers to cope with fast data transfers, on either a byte level or a bit level.

On the byte level, a device may be able to receive bytes of data at a fast rate, but needs more time to store a received byte or prepare another byte to be transmitted. Slaves can then hold the SCL line LOW after reception and acknowledgement of a byte to force the master into a wait state until the slave is ready for the next byte transfer in a type of handshake procedure.

On the bit level, a device such as a microcontroller with or without limited hardware for the I²C-bus, can slow down the bus clock by extending each clock LOW period. The speed of any master is thereby adapted to the internal operating rate of this device."

In the inventive apparatus, the clock synchronization mechanism is used by the software running on the firewall apparatus microcontroller 201 to selectively stall either the port-A bus 206, 210 or the port-B bus 212, 216. In this way, the software controls the progress of the transaction on both sides of the firewall apparatus 200. It should be noted that the port-A master 202 must correctly implement this clock synchronization mechanism for it to work correctly with the inventive firewall apparatus 200. Since the mechanism applies equally to single-master and multimaster I²C systems, this requirement places no additional burden on the port-A master 202 beyond that associated with simple single-master I²C operation.

In a preferred embodiment, the firewall apparatus is implemented in a programmable microcontroller, but other implementations are possible. A microcontroller, which is suitable for use with the invention, is the device 87LPC764, manufactured and sold by Philips Semiconductor Corporation. This controller is programmed with firmware, and hence the preferred embodiment is a combined hardware and software implementation. In addition to other hardware resources, this microcontroller has one multimaster I²C interface. Clearly, however, the inventive apparatus needs two I²C interfaces to fulfill its function as a firewall. Thus, the microcontroller's built-in I²C interface is used for the port-B bus 212, 216 and the port-A slave-only interface is implemented using two GPIO pins on the microcontroller and a software "bit-bang" driver.

Figure 3:
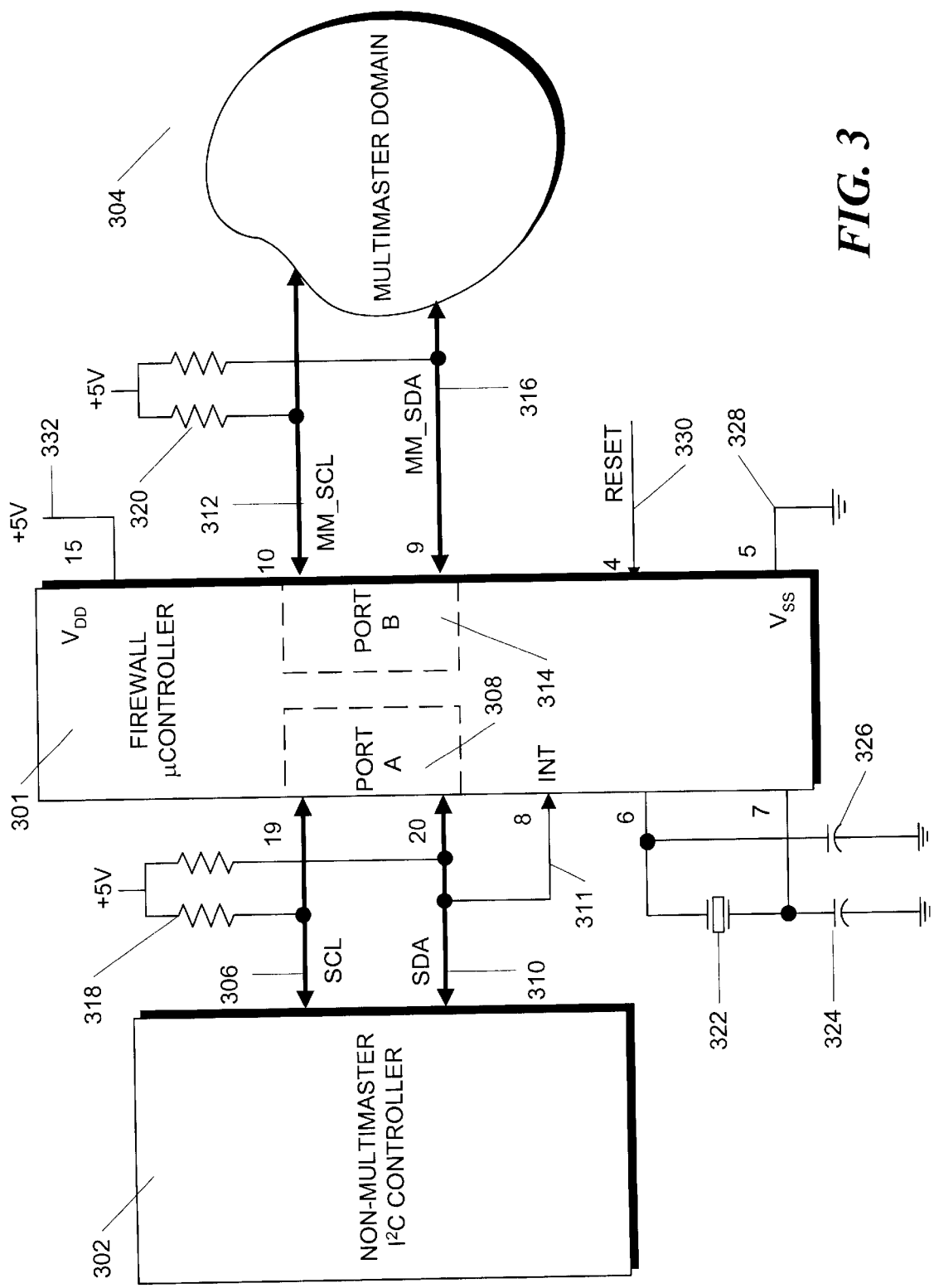
FIG. 3 is a more detailed block schematic diagram of the inventive firewall apparatus implemented with a microcontroller and connected between a single master $I^2C$ device and a multimaster $I^2C$ domain.

FIG. 3 shows how a microcontroller 301 is used to connect a non-multimaster-capable I²C device 302 to a multimaster bus domain 304. In FIG. 3, elements that correspond to elements in FIG. 2 have been given corresponding numerals. For example, microcontroller 301 in FIG. 3 corresponds to microcontroller 201 in FIG. 2. The description of elements in FIG. 2 that correspond to elements in FIG. 3 is applicable to FIG. 3.

The 87LPC764 controller 301 includes 4 KB of One-Time-Programmable (OTP) internal memory that is used as program code space. Thus, the firewall software is embedded within the 87LPC764 controller 301. The 87LPC764 controller 301 runs with a 20 MHZ input clock provided by crystal 322 and capacitors 324 and 326, and has an internal machine cycle which is $\frac{1}{6}^{th}$ of the input clock, or approximately 3.3 MHz. The reason why this machine cycle is of concern for the inventive firewall is that the port-A interface 308 is implemented purely via software and two GPIO pins, 19 and 20. In order to reliably implement such a bit-bang I²C slave interface and allow it to run at the full speed of 100 Kbits/sec, the software must be able to poll (and act upon) the port-A SDA/SCL pins 19 and 20 between 2–3 times during the minimum 4.7 microsecond SCL HIGH time given in the I²C Specification. The requirement of polling greater than twice in this interval is to ensure that the SCL/SDA pins are seen correctly during the SCL HIGH time even if the polling loop just misses an initial transition of SCL=LOW to SCL=HIGH, in which case the polling loop must go through two iterations before SCL=HIGH will be detected.

The polling loop used in the inventive firewall software to monitor the port-A interface 308 executes every 1.5 microseconds, which exceeds two iterations in the minimum SCL HIGH time of 4.7 microseconds with margin to spare. Thus, the 20 MHz 87LPC764 microcontroller 301 has sufficient performance to implement a bit-bang I²C slave port at 100 Kbits/sec.

The 87LPC764 microcontroller includes one multimaster-capable I²C interface. In the present application, this port is reserved for the port-B interface 314, since this interface connects to the system's multimaster domain. This I²C interface presents the software running on the 87LPC764 with a 1-bit wide data path onto the I²C bus, so software must interact with the register interface on a bit-by-bit basis. Although this requires more software to drive the I²C interface than with byte-oriented I²C devices, the bit-oriented interface is actually preferred in that it allows software a much finer level of control over the bus 312, 316. This is particularly useful during bus recovery procedures after a fatal protocol error that causes the bus to hang.

One attribute of the internal I²C control logic (not shown) of the 87LPC764 microcontroller 301 which is inconvenient is that the I²C baud rate is intimately linked to the microcontroller machine cycle through a hardware timer (not shown). This timer counts machine cycles to control the timing of I²C operations on the port-B bus 312, 316. Unfortunately, the entire I²C core in the 87LPC764 microcontroller 301 is identical to that from older, slower, 8051 derivatives, namely the 87C751. This latter device had a much slower maximum machine cycle frequency than the 87LPC764. Therefore, the I²C core in the 87LPC764 microcontroller 301 will generate invalid I²C timing if the core is run faster than around 8 MHz.

Thus, there are conflicting requirements: (1) The bit-bang port-A interface 308 requires the microcontroller 301 to run at 20 MHz, and (2), the 87LPC764 I²C logic requires the microcontroller to run at 8 MHz or less. Fortunately, the 87LPC764 microcontroller 301 provides a software-programmable register (not shown) to alter the operating frequency. Using this register, the inventive firewall software dynamically alters the operating frequency depending on whether the port-A bus 306, 310 or the port-B bus 312, 316 is being stimulated. Specifically, the microcontroller 301 runs at 20 MHz for port-A 308 operations, and is slowed down to 5 MHz for port-B 314 operations.

In order to reliably detect new START conditions on the port-A interface 308 while finishing up the end of a previous I²C transaction on the port-B interface 314, the port-A SDA line 310 is connected to the microcontroller 301 external interrupt input on pin 8 via lead 311, in addition to being connected to the appropriate port-A GPIO pin 20. This interrupt is enabled only when the port-A bus 306, 310 is not busy, i.e. immediately after a reset, and between STOP and START conditions on the port-A bus 306, 310. Thus, the initial START condition of any port-A transaction is detected via this interrupt mechanism, while all other port-A activity for the remainder of a transaction is detected via polling.

In addition to acting as an I²C firewall, the firewall apparatus 301 also acts as a slave device to the bus master 302 connected to port-A 308. Like any I²C slave device, the firewall apparatus will drive the SDA line 310 during read transactions to transmit data to the port-A master 302. As such, if the port-A master 302 hangs, crashes, or for any reason ceases activity on the port-A interface 308 in the middle of a transaction, the firewall apparatus 301 will, in turn, cease activity on the port-A bus 306, 310, and on the port-B multimaster bus 312, 316. In order to prevent a sick port-A master 302 from hanging the entire multimaster domain 304, the firewall apparatus 301 utilizes a watchdog timer (not shown) in the microcontroller 301 to detect a hung port-A transaction. When this happens, after one second of no activity on the port-A interface 308-during a port-A transaction, the microcontroller 301 will undergo a hardware reset. This reset clears all state information within the microcontroller 301 and releases both the port-A and port-B interfaces, 308 and 314, respectively.

This reset operation is particularly important to prevent a potential deadlock on the port-A interface 308, as follows: if the port-A master 302 crashes or for some other reason aborts a port-A read transaction while the firewall apparatus 301 is driving the SDA line 310 LOW to the port-A master 302, then the firewall apparatus 301 will simply stay in that state, waiting for additional clock pulses on the SCL line 306. If the port-A master 302 recovers, it may attempt to restart the transaction, but it will be unable to launch a START condition on the port-A interface 308 due to the fact that the firewall device 301 is holding SDA line 310 LOW, thereby resulting in a deadlock. Utilizing the watchdog timer, the firewall device 301 will reset itself after one second, allowing the port-A master 302 to restart the transaction normally. In normal operation, this never occurs because the port-A master 302 always terminates transactions via a STOP condition. The watchdog timer is used here only to recover from pathologically bad behavior on the part of the port-A master 302.

Figure 4:
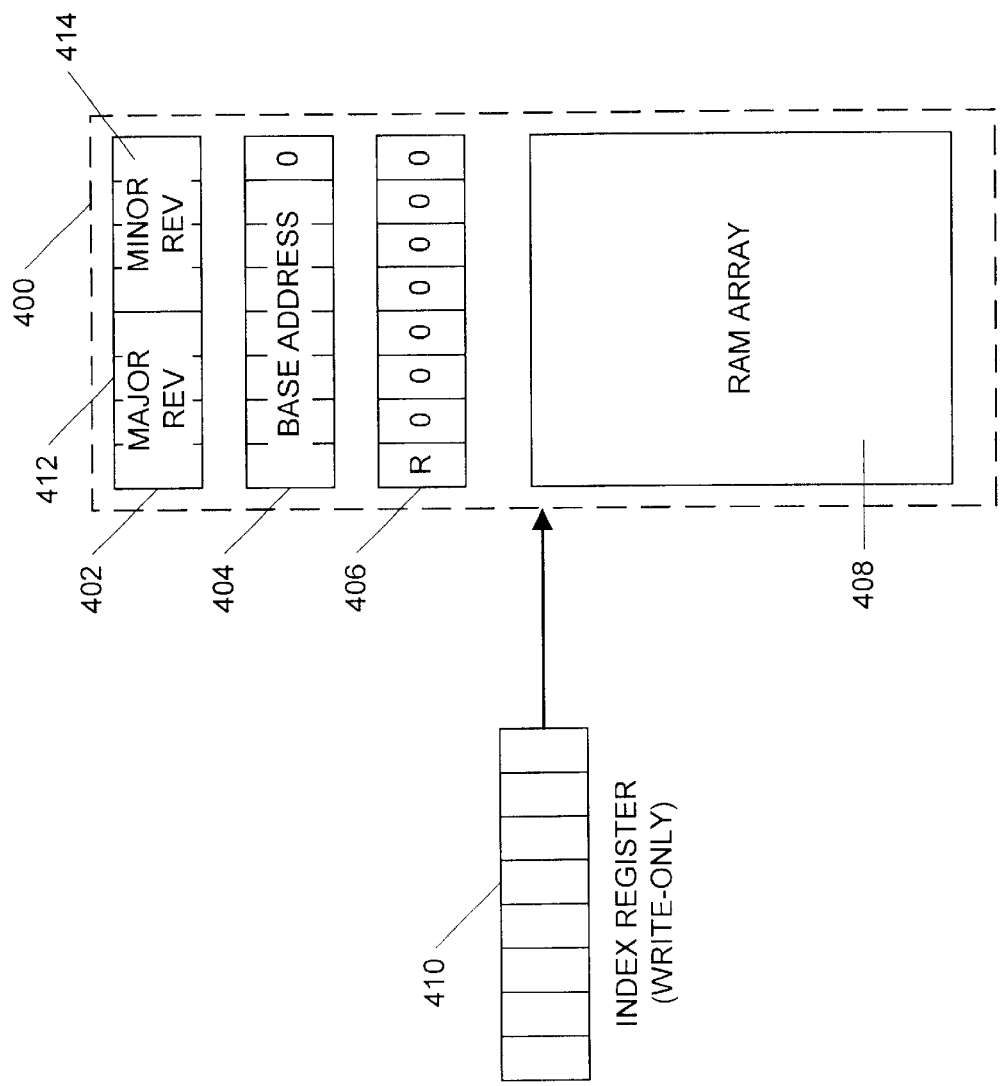
FIG. 4 is a block schematic diagram of a register set within the microcontroller which register set is accessible by the port-A master.

In addition to its normal transparent mode of operation, the firewall apparatus also incorporates a bank of registers that may be accessed by software running on the port-A master 302. These registers are illustrated in FIG. 4 and provide information to the port-A master 302 regarding the firmware revision of the firewall apparatus chip, allow the I²C addresses used by the firewall apparatus to be changed, and allow the firewall apparatus to be reset under software control by the port-A master 302. The apparatus also provides access to a 32-byte RAM array 408 that is not used by the firewall apparatus, but is made available through this register interface for diagnostic purposes. One foreseeable use of this 32-byte RAM array 408 would be as an address bitmap indicating which I²C addresses reside on the port-A interface and which are on port-B interface, thereby permitting the firewall apparatus to implement address filtering. This would allow the single-master bus 306, 310 to have other slave devices in addition to the firewall apparatus.

The mechanism provided for accessing the internal register space is similar to that used by other I²C devices. The firewall apparatus 301 provides an index register 410 that is used to read and write the internal register array 400. The index register 410 acts as a pointer through which the contents of the register array 400 may be read and written. The index register 410 determines which location in the array that is accessible.

The I²C addresses used by the firewall apparatus 301 are determined by the contents of the BASE register 404, and default to 0x60 and 0x61, where 0x60 is the write-address, and 0x61 is the read address, as per standard I²C addressing. The index register 410 is write-only via address 0x60, while the register array 400 is writable at address 0x60 and readable at address 0x61. Since write operations to both the index register 410 and register array 400 must be affected through I²C address 0x60, the apparatus discriminates between the two based on the following rule: data intended for the index register 410 must always be the first byte following the address phase in a write transaction. Subsequent bytes in the same write operation will be directed into the register array 400 starting at the offset indicated by the index register 410.

In order to facilitate the reading and writing of multiple consecutive bytes within the register array 400, the index register 410 automatically increments by one after every byte transferred to or from the array 400. This is true whether a given I²C transaction moves multiple bytes in a single operation, or only a single byte; the index register 410 increments in either case.

Attempts to write the index register 410 with invalid offset values will be ignored. Similarly, if while reading or writing multiple bytes in a single transaction the auto-increment feature of the index register 410 would result in an invalid index, the index register 410 will not increment, thus causing subsequent bytes to be read from or written to the last location in the register array 400.

Note that the actual location of the index register 410 within the apparatus may be changed by rewriting the BASE register 404 with a new value. This register 404 must be written with the desired address of the index register 410. The apparatus will then occupy address "BASE" and "BASE+1" as described above for accessing the index register 410, and register array 400.

The REVISION register 402 appears within the array 400 at offset 0, and contains an encoding of the software revision of the firewall apparatus chip. The major revision 416 is given in bits <7:4>, while the minor revision 418 is given in bits <3:0>. For example, a hypothetical software revision level of "1.7" would result in a value in he REVISION register 402 of 00010111b, or 17 hex.

The BASE register 404, at offset 1 in the register array 400, contains the base address used by the firewall apparatus for accesses to the register array 400. This register 404 defaults to 0x60 at reset, and may be changed, via an I²C transaction from the port-A master 302. Note that since register array accesses are not forwarded to the port-B multimaster bus 312, 316, address conflicts between the index register 410 and actual devices on the port-B bus 312, 316 do not occur. Furthermore, as described below, when the firewall apparatus has entered a so-called "transparent mode", all I²C address and data bits are passed to the port-B bus 312, 316. Thus, it is possible to selectively access the register array 400 and port-B devices even if they occupy the same I²C addresses. Nonetheless, it is conceptually less confusing if the addresses are kept unique. Therefore, for ease of software development, the address used by the index register pair 410 is programmable via the BASE register 404. In the BASE register 404, the base address is programmed in bits <7:0> with bit <0> being forced to 0 to ensure that the index register 410 is on an even address.

The RESET register 406, at offset 2, can be used by the port-A master 302 to force a hardware reset of the firewall apparatus. This may be useful either as part of the port-A master's own I²C initialization sequence, or perhaps as part of diagnostic or fault recovery code running on the port-A master 302. The only bit of interest in this register is bit 7, which, when written with a "1", will force a hardware reset of the firewall apparatus following the completion of the current port-A I²C transaction. The duration of this reset, and the subsequent reinitialization of the apparatus, is approximately 25 microseconds, so the port-A master 302 must refrain from starting any new I²C transactions for at least this amount of time after completing the write to the RESET register 406.

However, resetting the firewall apparatus via this mechanism causes that apparatus to believe the port-B multimaster bus 312, 316 is "idle", even if a transaction is in progress from another master. The firewall apparatus will come back into synchronization with the actual state of the port-B bus 312, 316 upon detecting the next START or STOP condition. However, in order to prevent the apparatus from initiating a transaction on top of one already in progress from another master, the port-A master 302 should wait, after resetting the firewall apparatus via the RESET register 406, for an amount of time equal to the longest possible I²C transaction. This time is clearly dependent on the implementation of the other masters in the system, so this "maximum transaction time" needs to be agreed upon by all masters in the system. This is a general I²C requirement, and not specific to the inventive firewall apparatus. Illustratively, 200 ms may be used for this waiting time. The RESET register 406 always returns '00h' when read.

Starting at offset 0x20, there is a RAM array 408 of 32 bytes that may be accessed by the port-A master 302. In the preferred embodiment, this array 408 is available as scratchpad memory, and may be used as a diagnostic area for testing the firewall apparatus. Other embodiments may use this RAM array 408 for internal functions, such as an address bitmap used by the firewall to filter addresses coming from the port-A master device 302. This enhancement would allow other slave devices on the non-multimaster I²C bus 306, 310.

During normal operation, the firewall apparatus acts transparently, passing address and data bits back and forth between the port-A and port-B I²C interfaces, 308 and 314. In other words, the port-A master 302 is unaware of the presence of the firewall apparatus 301 from both a data and protocol perspective. Access to the register array 400 internal to the firewall apparatus, on the other hand, follows a different model of operation. The register array 400 accesses are handled in what will hereafter be referred to as "local mode" operation. In local mode, the port-A master 302 may use the port-A I²C bus 306, 310 to access the internal register array 400. The firewall apparatus 301 does not pass any of the I²C information associated with the local mode access to the port-B interface 314. This is in contrast to the normal "transparent mode" of operation in which address and data bits pass transparently between the port-A and port-B I²C interfaces 308 and 314.

The firewall apparatus 301 chooses between transparent and local modes of operation based on the first address it receives following an initial START condition, where an initial START condition is defined as a START condition following a bus-idle condition. If the first address that is received is to the internal index register 410 defined by the BASE register 404, then the firewall apparatus will enter the local mode operation, where it will remain until the current transaction completes with a STOP condition, or until the port-A master 302 issues a repeated START with an address other than the index register 410 whichever comes first. Normally it is expected that the port-A master 302 will perform local and transparent mode activity via separate I²C transactions, separately by a STOP condition.

The firewall apparatus will never switch from transparent mode into local mode in the middle of an I²C transaction. In other words, if the port-A master 302 wishes to access the internal register array 400, any current transparent mode activity must be terminated normally by the port-A master 302, via a STOP condition, whereupon the local mode access may be initiated with a new START condition.

Since the behavior of the firewall apparatus is determined chiefly by software that programs the microcontroller 301, an overview of that software is discussed below. Since as mentioned above, the clock speed is run at two different clock frequencies: 5 MHz for operations to the port-B multimaster bus 312, 316, or 20 MHz for operations to the port-A bit-bang bus 306, 310, the firewall software generally never allows activity both I²C ports 308 and 314, with one exception. In particular, selective stalling of the two I²C segments 306, 310 and 312, 316 connected to the apparatus 301 takes advantage of the clock synchronization mechanism, described above and allows the firewall software to concern itself with only one port at a time.

The manner in which the ports 308 and 314 are stalled is for the firewall software to wait for the bus master driving the associated SCL pin (pin 19 in the case of port A 308 and pin 10 in the case of port B 314) to drive the SCL bus into a LOW state. In the case of port-A 308, the firewall software then writes a "0" to the SCL line 306 to jam it in a LOW state until such time as the firewall software wishes to allow the transaction to proceed again. In the case of port-B 314, the internal I²C hardware in the microcontroller 301 will keep the port-B SCL line 312 in a LOW state until the hardware is activated via the software. Thus, the firewall software is able to pass address and/or data bits back and forth between the two segments 306, 310 and 312, 316, keeping one segment stalled while servicing the other, and changing the clock speed to match the port being serviced.

There is one case where both ports 308 and 314 may be active at the same time. At the end of a transaction, the port-A master 302 will drive a STOP condition. When this happens, the firewall apparatus must transmit the STOP condition on the port-B bus 312, 316, while simultaneously being able to handle a new START condition on the port-A bus 306, 310. For this reason, the port-A SDA line 310 is connected to the microcontroller's external interrupt input (pin 8) via lead 311. This interrupt is enabled only after a STOP condition associated with the previous transaction is detected on the port-A bus 306, 310.

The software routine servicing the interrupt must make use of the state dispatch polling mechanism on port-A 308, and, therefore, the clock speed must be left running at 20 MHz while the STOP condition is transmitted on the port-B bus 312, 316. This would normally cause invalid bus timing on the port-B bus 312, 316 if the microcontroller's internal I²C hardware were used to generate the STOP condition. Instead, the firewall software bit-bangs the STOP condition onto the port-B bus 312, 316 with the clock running at 20 MHz. If a new START occurs on port-A bus 306, 310 during this interval, the execution time of the interrupt service routine will stretch the port-B STOP condition slightly, but this is of no consequence. At all other times during a transaction, port-B 314 is driven directly by the microcontroller's internal I²C controller hardware (not shown) with the clock running at 5 MHz.

The only interrupt used in the preferred firewall software implementation is for port-A START detection at the beginning of a transaction. Since a START is signaled by SDA line 310 going HIGH to LOW, this signal is connected to a low-true interrupt input on the microcontroller 301 (pin 8.) Also, the firewall software enables this interrupt only after a previous STOP condition (or after coming out of a reset condition), so it is known in advance that the next LOW level on the port-A SDA line 310 will be a START. However, the interrupt service routine verifies that the combined SCL/SDA line pair 306, 310 formed a valid START before proceeding.

Figure 5:
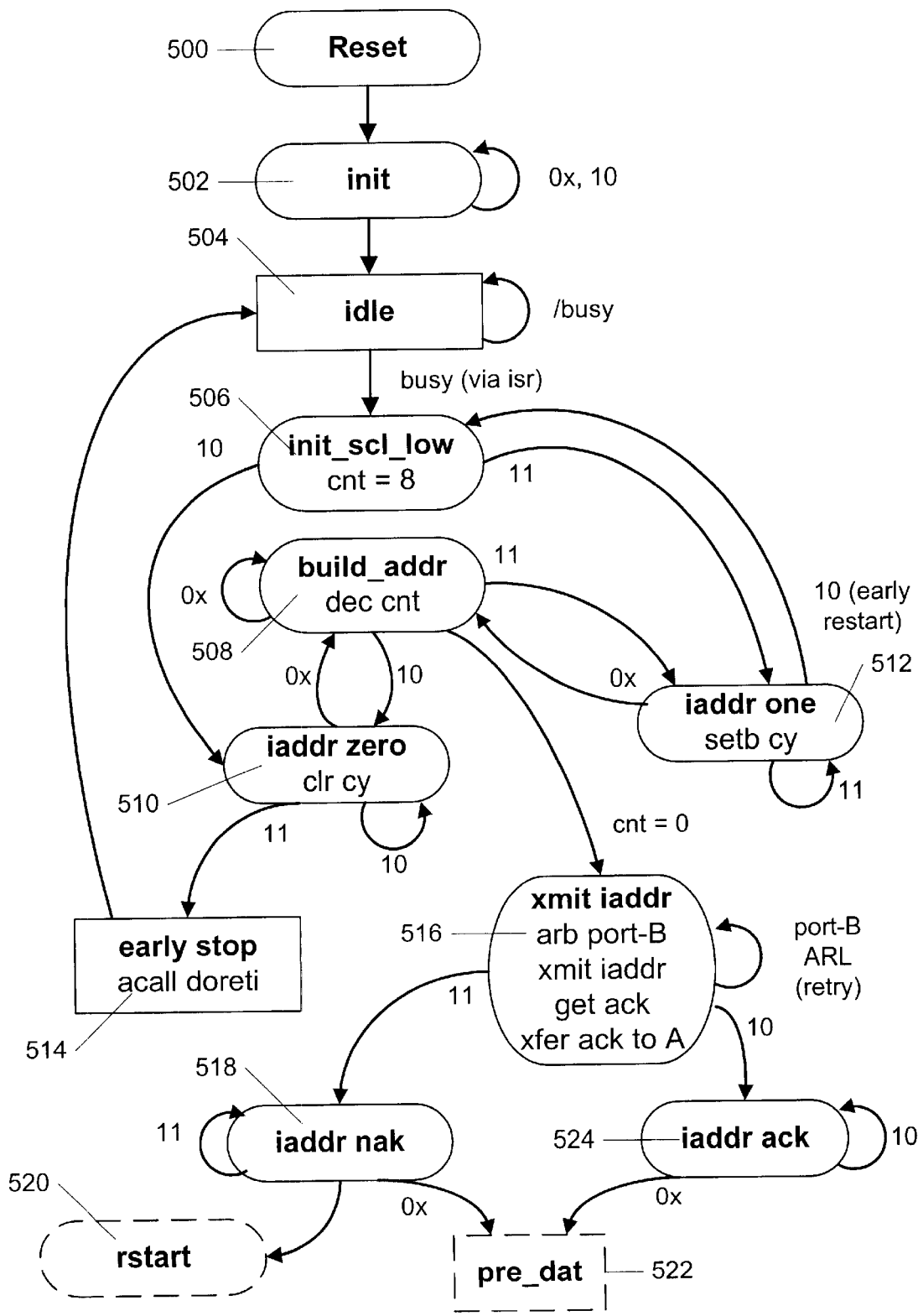
FIG. 5 is a state diagram illustrating the processing of initial address information.

The main body of the firewall apparatus software comprises a software state machine which runs synchronously to the port-A interface 308. FIG. 5 is a state diagram that shows the initial address flow. In this diagram, and those that follow, the ellipses represent states, which are defined as a section of code that jumps through a state dispatch mechanism, which is described below, to another state or functional block. A functional block, represented in the diagrams with a rectangle, is a section of code that does not exit via the state dispatch mechanism, but instead through a simple jump. Most arcs that connect the states and functional blocks have a notation of the form 0x, 10, or 11. This notation indicates the state of the port-A SCL/SDA pins, respectively. Therefore, for example, an arc labeled 0x means the software follows this arc when SCL is LOW, and SDA is HIGH or LOW. States and functional blocks drawn with dashed lines represent destinations that are fully described in other figures.

The signaling method defined in the I²C bus specification is such that both the SCL and SDA lines must be watched simultaneously in order to detect START and STOP conditions. Therefore, the software that stimulates the bit-bang port-A interface 308 samples both signals simultaneously when making decisions regarding transitions of the port-A state machine. In addition, in order for the software to keep up with the required 100 Kbit/sec bit rate on the bus, an efficient method of dispatching the port-A state machine based on the sampled port-A SCL/SDA data was needed.

In a preferred embodiment, the state dispatch method chosen uses jump tables, with a separate jump table dedicated to each state of the port-A software state machine. In order to take action on both the SCL and SDA pins simultaneously, the software uses the value of SCL and SDA, which are connected to the microcontroller's port#0 bits <2:1>, respectively, as a binary offset into the jump table. By loading the address of the jump table into the microcontroller "dptr" register, the single instruction "jmp @a+dptr" jumps to the correct entry in the jump table that codes for the current value of SCL and SDA, and thus dispatches to the next state.

FIG. 5 shows the initial address states and program flow. The software starts in the power-on reset state 500 and proceeds to the initialization state 502. From the initialization state, the software proceeds to the idle block 504 where the state machine awaits a START condition from the port-A master 302. When the START is seen, as indicated by the busy flag being set by the interrupt service routine (described below), the code proceeds to the state 506 called init_scl_low.

The init_scl_low state 506 simply initializes the cnt variable and then dispatches to the states, 510 and 512, that accumulate address bits until the entire initial address and read/write bit has been received from port-A master 302. After that, control passes to the xmit iaddr state 516.

In the iaddr zero state 510, an address bit '0' has been received by the state machine from the port-A master 302. The value of the address bit is saved in the carry flag via a clear carry command, and then the dispatch mechanism is invoked to progress to the next state, or wait here in this state if the port-A SCL/SDA signals have not yet changed.

The jump table for the iaddr zero state 510 has four possible destination states and functional blocks to which control can flow from state 510. The software arrived in state 510 because the SCL line went HIGH with the SDA line low, thus indicating a "0" bit, which in this case happens to be an address bit. When dispatching out of this state, if the SCL/SDA line pair still has the value "10", then control remains in state 510, as evidenced by the jump back to state 510. Similarly, if the SCL/SDA line pair signals a transition from "10" to "11", a STOP condition has occurred. Hence, the state 510 dispatches to block 514, which handles a STOP condition prior to the completion of the initial address.

In the iaddr one state 512, an address bit '1' has been received by the state machine from the port-A master 302. The value of the address bit is saved in the carry flag via a set carry command, and then the dispatch mechanism is invoked to progress to the next state, or wait here in this state if the port-A SCL/SDA signals have not yet changed.

The jump table for the iaddr one state 512 has four possible destination states and functional blocks to which control can flow from state 512. The software arrived in state 512 because the SCL line went HIGH with the SDA line high, thus indicating a "1" bit, which in this case happens to be an address bit. When dispatching out of this state, if the SCL/SDA line pair still has the value "11", then control remains in state 512, as evidenced by the jump back to state 512. Similarly, if the SCL/SDA line pair signals a transition from "11" to "10", a restart condition has occurred. Hence, the state 512 dispatches back to state 506, which handles the restart condition.

The xmit iaddr state 516 is the first place in the code where the multimaster port-B I²C bus is used. After waiting for the bus to become free using the I²C arbitration mechanism, the initial address is transmitted on the bus and an acknowledge pulse (ACK or NAK) is received from the addressed slave. In the event that arbitration is lost during the transmission of this initial address, the code in the xmit iaddr state 516 will retry a limited number of times to successfully transmit the address on the bus. This is the only place in the firewall apparatus design where the firewall will automatically retry an operation. This initial address is retried here because a loss of arbitration during a transaction's initial address phase is considered normal correct behavior in a multimaster system. Therefore, in order to avoid unduly burdening the port-A master 302 with NAKs, the firewall repeatedly retries the transmission of the initial address.

In the xmit iaddr state 516, the software stalls the port-A bus 306, 310 by driving the port-A SCL line 306 LOW. Thus, the port-A master 302 is forced to wait while the firewall apparatus is communication on the port-B bus 312, 316. This method of stalling the port-A bus when the SCL line goes LOW is used in almost all the states where SCL is low coming into the state. This allows software the time it requires to complete the work associated with the state, while holding off the port-A master 302 until software is ready to proceed to the next state.

Following, the successful transmission of the initial address, the software passes the ACK/NAK bit received from the slave device back to the port-A bus 306, 310, and then proceeds to state 518 in the case a NAK is received or to state 524 in the case an ACK is received. From states 518 and 524, the code flow proceeds to the pre_dat block 522 which is the data processing phase of the transaction or to the restart state 520 in the case when a repeated START is received.

Figure 6A:
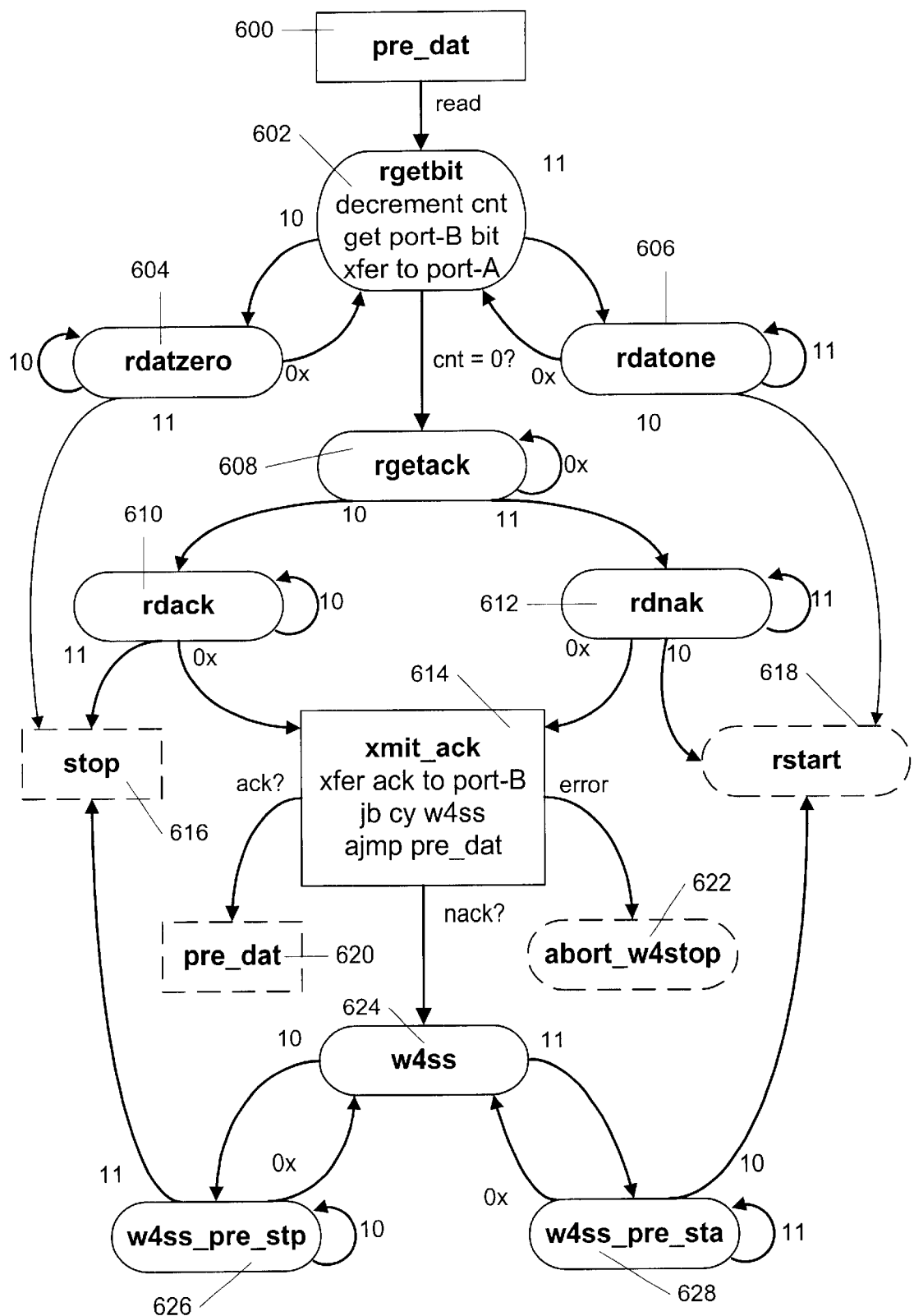
FIGS. 6A and 6B are state diagrams illustrating the read and write processing, respectively, of data transmitted between the single master device and multimaster domain.
Figure 6B:
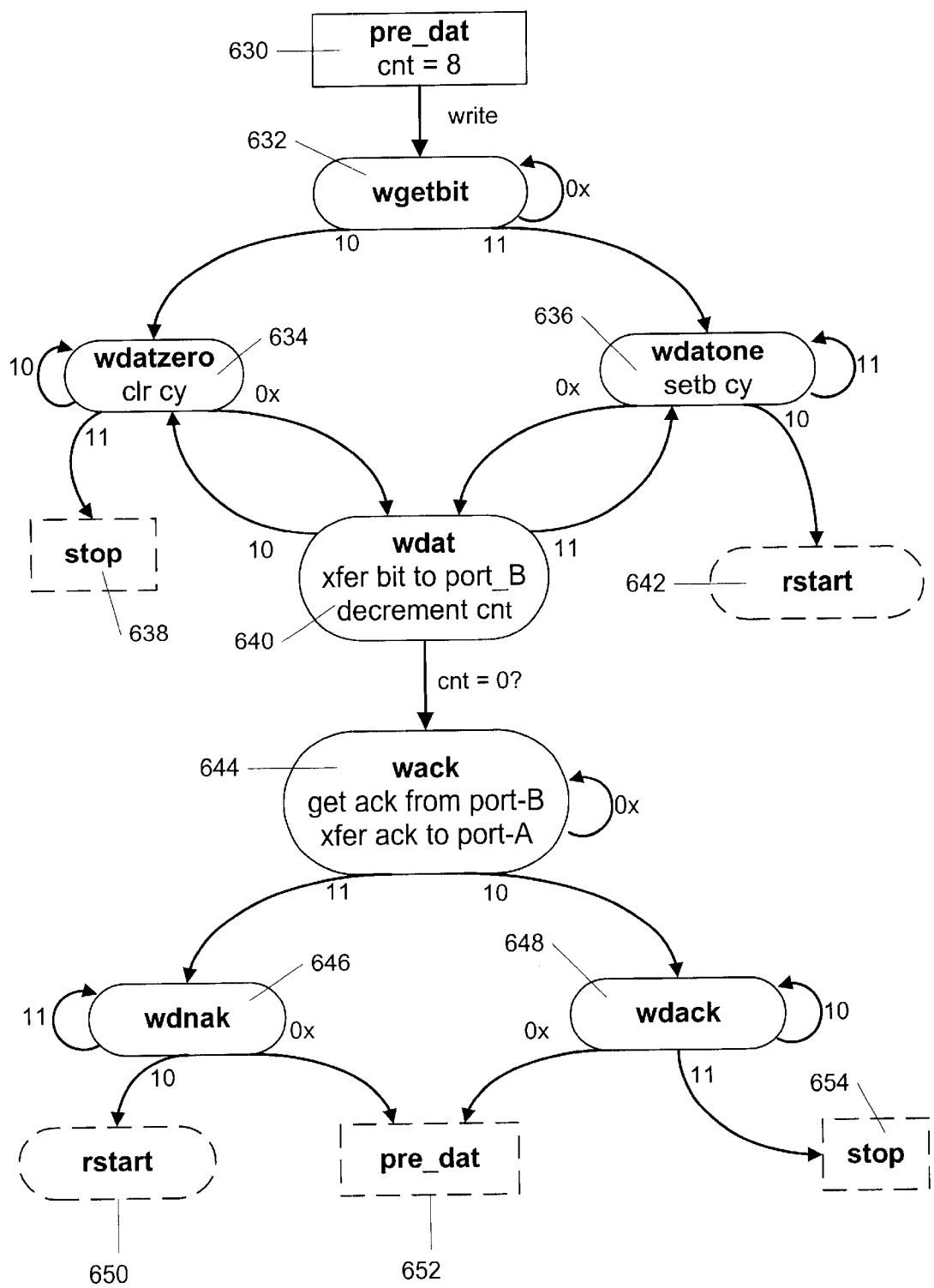

FIGS. 6A and 6B show the state flow for the data portion of all transparent mode transactions. After an address phase completes as indicated in FIG. 5, control passes to the pre_dat block 522, which simply initializes the bit counter and passes control either to the read flow shown in FIG. 6A or the write flow shown in FIG. 6B, respectively. From that point, control flows similarly for reads and writes. The read and write flows differ slightly to accommodate the differing transmission direction of ACK bits; ACK bits are driven from port-A 308 to port-B 314 for reads, and the opposite for writes.

In the read flow illustrated in FIG. 6A, unlike the initial address phase, in states 602, 604 and 606 data bits are passed between the port-A and port-B I$^2$C busses on a bit-by-bit basis. In particular in the rgetbit state 602, the code decrements the cnt variable, obtains a port-B bit and transfers the bit to port_A. The state 602 then dispatches to either state 604 or state 606 depending on whether the bit was a "1" or "0." States 604 and 606 detect whether a STOP or START condition occurs, respectively. For example, a transition of the SDA line from LOW to HIGH with the SCL line HIGH indicates a STOP condition. In this case, state 604 dispatches to the stop processing block 616. Alternatively, a transition of the SDA line from HIGH to LOW with the SCL line HIGH indicates a START condition. In this case, state 606 dispatches to the repeated START state 618.

Operation continues in this manner until the cnt variable reaches zero, at which point the state 602 dispatches to state 608 in which the code drives the SDA line 310 HIGH and waits for either an ACK or a NAK from the port-A master 302. In the case of an ACK received, the code dispatches to state 610 and then to state 614. If a NAK is received the code dispatches to state 612 and state 614. In both states 610 and 612, the state of the SDA line is stored in the carry bit. Alternatively, if a STOP is received in state 610, the code flow dispatches to processing block 616 to process the stop condition. If, in state 612, a START condition is received, the code flow dispatches to state 618 to process the repeated START condition as discussed below.

In step 614, either an ACK or a NAK has been received from the port-A master 302. The received ACK or NAK is then transmitted to the port-B interface 314 for transmission to the slave device. If an ACK has been received, the code flow dispatches back to state 620 to process additional data bytes. At the end of a read transaction, the port-A master 302 will send a NAK to the slave device in response to the reception of the last data byte in order to signal to the slave device that it should stop driving data on the SDA line. When this occurs, the read transaction is complete, and the code enters a state w4ss 624 where it simply watches for a START or STOP condition. A START condition is received as indicated by a dispatch to state 628 and then to state 618 where a repeated START condition is processed (discussed below.) Alternatively, if a STOP condition is received, the code dispatches to state 626 and then to a stop block 616 for processing the stop condition. In state 614 an error in the reception of an ACK or NAK signal causes a jump to a common error routine 622 which is discussed below.

In the write data processing flow illustrated in FIG. 6B, in a similar manner to the read processing flow, in states 632, 634 and 636, data bits are passed from the port-A I$^2$C bus to the port-B bus on a bit-by-bit basis. In particular, if a "0" is received from the port-A master 302 as indicated by a dispatch through states 632 and 634 to state 640, the code stores the received bit in the carry flag, transfers the stored bit to port-B and decrements the cnt variable. If a "1" is received from the port-A master 302 as indicated by a dispatch through states 632 and 636 to state 640, the code stores the received bit in the carry flag, transfers the stored bit to port-B and decrements the cnt variable. A STOP condition generated by the port-A master, as indicated by a dispatch through states 632 and 634 reaches processing block 638 which handles the STOP condition. Alternatively, a START condition generated by the port-A master, as indicated by a dispatch through states 632 and 636 reaches state 642 which handles the START condition.

Operation continues in this manner until the cnt variable reaches zero, at which point the state 640 dispatches to state 644 in which the code waits for either an ACK or a NAK from the slave device on port-B and transfers the ACK/NAK to the port-A master. After transferring the ACK or NAK from the port-B slave device to the port-A master 302 the control passes back to processing block 652 to continue the transaction as directed by the port-A master 302. Alternatively, START and STOP conditions detected by dispatches through states 646 to 650 and 648 to processing block 654 are handled by state 650 and processing block 654, respectively.

Unlike the initial START and initial address phase of an I$^2$C transaction, the firewall apparatus does not buffer address information following a repeated START. This follows the general philosophy that the firewall apparatus buffers as little data as possible in order to remain as transparent as possible. As mentioned earlier, the buffering of the entire initial address is necessary to hide the normal arbitration losses and retries that may occur before successfully acquiring the port-B multimaster bus.

Figure 7:
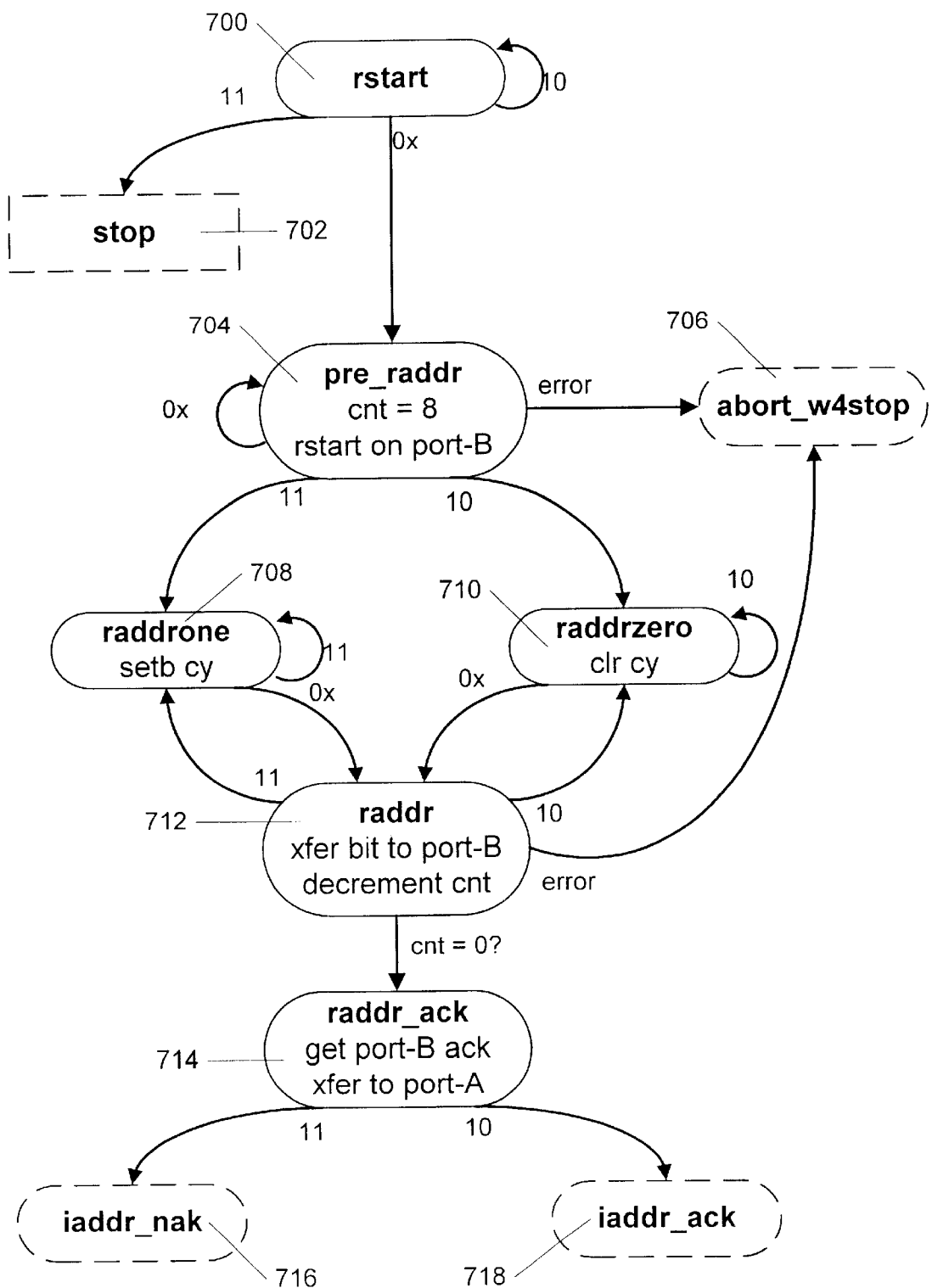
FIG. 7 is a state diagram illustrating the processing of a repeated START condition generated by the port-A master.

The repeated start state flow is shown in FIG. 7. This state is entered when the dispatch mechanism detects that signals on the SCL/SDA line pair changed from "11" to "10". This state flow is very similar to the write data flow illustrated in FIG. 6B, however, after moving 8 address bits and one ACK bit between the two ports, control joins up with the same state flow as used following an initial address.

In particular, the code flow starts in state 700. If the SCL/SDA line pair becomes "11", a STOP condition has been received and state 700 dispatches to processing block 702 to process the STOP condition.

Otherwise state 700 dispatches to state 704 in which the cnt variable is reset and a START condition is issued on the port-B interface 314. Data received from the port-A master is detected via dispatches through state 708 to 712 in the case of a "1" bit and through state 710 to state 712 in the case of a "0" bit. The received bit is stored in the carry flag in both of states 708 and 710. An error in either of states 704 or 712 causes a dispatch to processing block 706 to process the error.

In state 712, the stored bit is transferred to port-B and the cnt variable is decremented. When the count reaches zero, state 712 dispatches to state 714 where an ACK/NAK is received from port-B 314 and transferred to port-A 308. In the case of a NAK received, state 714 dispatches to state 716 which is the same as state 518 and processing continues from there. In the case of a ACK being received, state 714 dispatches to state 718 which is the same as state 524 and processing continues from there.

Any errors that occur on the port-B multimaster bus after the initial address phase cause control to pass to the common error state flow, called abort_w4stop, which stands for "abort and wait for a STOP condition". This state flow, shown in FIG. 8, does precisely what the name implies; any ongoing port-B transaction is aborted in state 800. If the firewall apparatus is still the master of the port-B bus, then it relinquishes control of the bus by sending a STOP condition on the bus. The current port-A transaction is also aborted by writing the port-A SDA and SCL lines HIGH.

The code flow then dispatches to state 802 state flow that waits for a STOP condition. Any repeated STARTs, address bits, or data bits which the port-A master 302 may read or write are responded to by the firewall apparatus as indicated by a dispatch to state 804 by returning a NAK response until the port-A master 302 terminates the transaction with a STOP condition.

This error flow accomplishes two things. First, it translates any port-B error conditions into port-A NAK bits that persist through the current port-A transaction. Since the port-B error condition caused the firewall apparatus to lose mastership of the multimaster bus, the firewall apparatus is unable to act upon further bytes in the current transaction. In addition, by waiting for the port-A master to perform a STOP, the firewall apparatus software is resynchronized with the port-A master 302. Once the STOP condition is detected, as indicated by a dispatch to processing block 806, the doreti routine is called, possibly placing the system in an idle condition as indicated by a jump to state 808.

Figure 8:
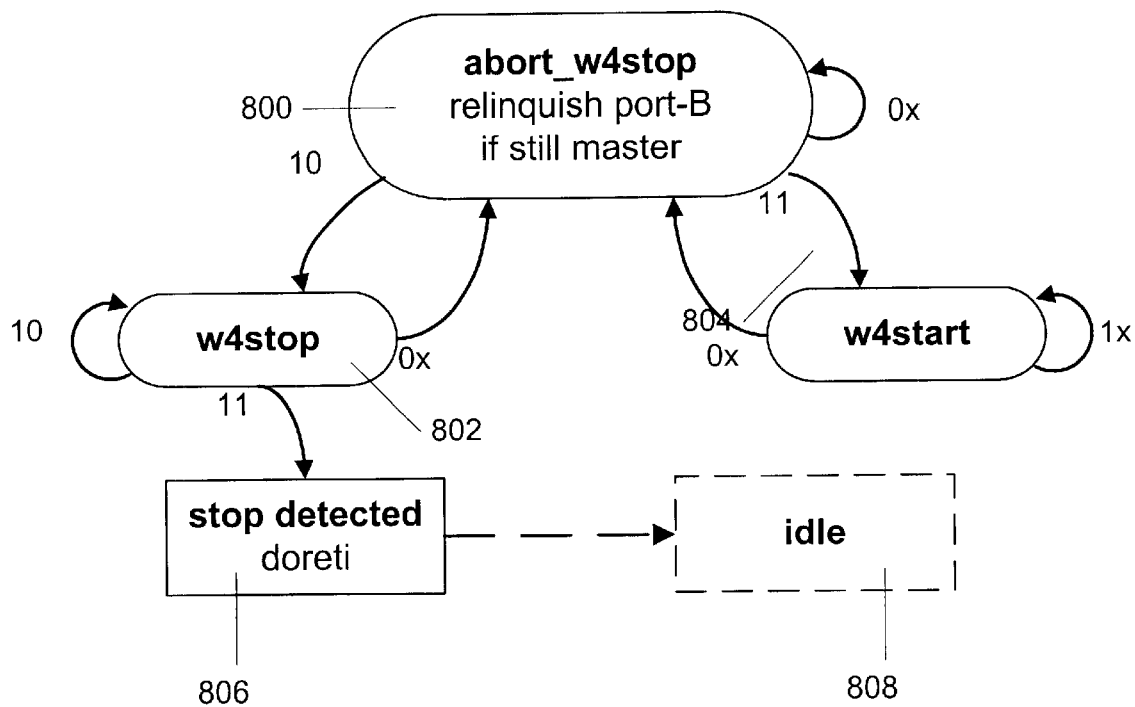
FIG. 8 is a state diagram illustrating the processing of a general error condition.

In addition to the error handling state flow shown in FIG. 8, the software has several timeout timers built into it to prevent pathological protocol violations on either port from hanging the firewall apparatus. For example, in a single-master $I^2C$ bus implementation, it is possible to hang the bus if the master initiates a read transaction to the slave and then aborts the transfer without following the correct protocol, which, in this case, is to respond to the last byte with a NAK and then generate a STOP condition. If the slave is driving zero's for data, then it will hold the SDA line low while it waits for the next SCL rising edge. If the master neglects to send a NAK to the last desired byte and thereby fails to inform the slave to stop driving the SDA line, then the slave may continue to drive SDA low. This makes it impossible for the master to drive a START or STOP condition, and the bus is effectively hung. The only way out of this scenario is for the master to realize the hung condition and stimulate clock pulses until the slave stops driving SDA LOW, which it will do during the ACK clock pulse, at which point the master may issue a STOP and restore the bus to usefulness. Unfortunately, many $I^2C$ masters are not sophisticated enough to perform this bus recovery procedure.

In a preferred embodiment, the firewall apparatus uses a watchdog timer built into the microcontroller 301 to detect when the port-A state machine remains in a non-idle state for approximately one second, at which point the microcontroller 301 will undergo a hardware reset. This reset releases the port-A SCL and SDA lines 306, 310 and allows the port-A master to retry its transaction. It is therefore critical that the port-A master never stall its own transactions for more than one second at any given state, as doing so would cause the firewall apparatus to reset.

Port-B 314 errors such as arbitration loss and asynchronous START/STOP errors are signaled by the $I^2C$ interface built into the microcontroller 310 and handled via the error state flow shown in FIG. 8. In addition to these types of errors, the software also implements software timeouts while waiting for specific events, such as when waiting for SCL rising or falling edges on the port-B $I^2C$ bus. If one of these events times out, then control passes to the error state flow.

In a preferred embodiment, two timeout values must not be exceeded on the port-B bus 312, 316 to prevent the firewall apparatus from entering its error flow. These are (1) that no port-B slave device shall stall a transaction with the SCL line 312 being held low for more than 100 milliseconds during any single clock cycle, and (2) that no port-B master may perform a transaction that exceeds 200 milliseconds in duration.

Failure to meet requirement (1) above will cause the firewall apparatus to assume that the multimaster bus is hung during a transaction in which it is currently master, and to therefore initiate its bus recovery procedure. Failure to meet requirement (2) above will cause the firewall apparatus to assume the multimaster bus is hung while it is waiting to become master, causing it to stop transaction processing and to respond with NAKs to all address and data bytes associated with the current port-A transaction.

Figure 9:
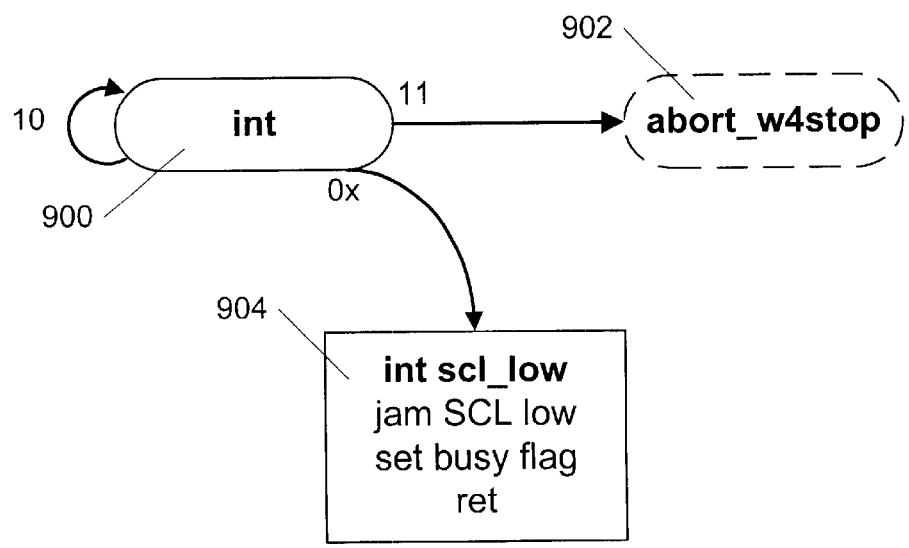
FIG. 9 is a state diagram illustrating interrupt service processing.

The interrupt service routine is illustrated in FIG. 9. This routine is used during the initial address processing to detect a valid START. The interrupt state 900 is initially entered via a hardware interrupt caused by a LOW level on the external interrupt pin (irq pin 8 shown in FIG. 3) of the microcontroller 301, which pin is connected to the port-A SDA line 310. Since the interrupt is only enabled after a STOP condition, the interrupt reliably detects a START condition.

When a start condition is detected, state 900 dispatches to state 904 where the interrupt routine drives the SCL data line 306 LOW and sets a busy flag to indicate the fact to the main initial address processing loop shown in FIG. 5. If the interrupted software flow was busy completing the previous transaction's STOP condition on the port-B bus 312, 316, the port-A master 302 is forced to wait until the firewall apparatus catches up. After completing a STOP transaction on the port-B bus 312, 316, control passes to the main loop in FIG. 5 which remains in state 504 waiting for the indication from the interrupt service routine that a new transaction has begun on port-A 308.

Alternatively, if, in state 900, it appears that the interrupt occurred on a data bit rather than a START condition, then the software assumes that synchronization between the port-A state machine and the port-A master 302 has been lost, and so passes control to the error state 902 to force a resynchronization by waiting for a STOP condition.

Figure 10A:
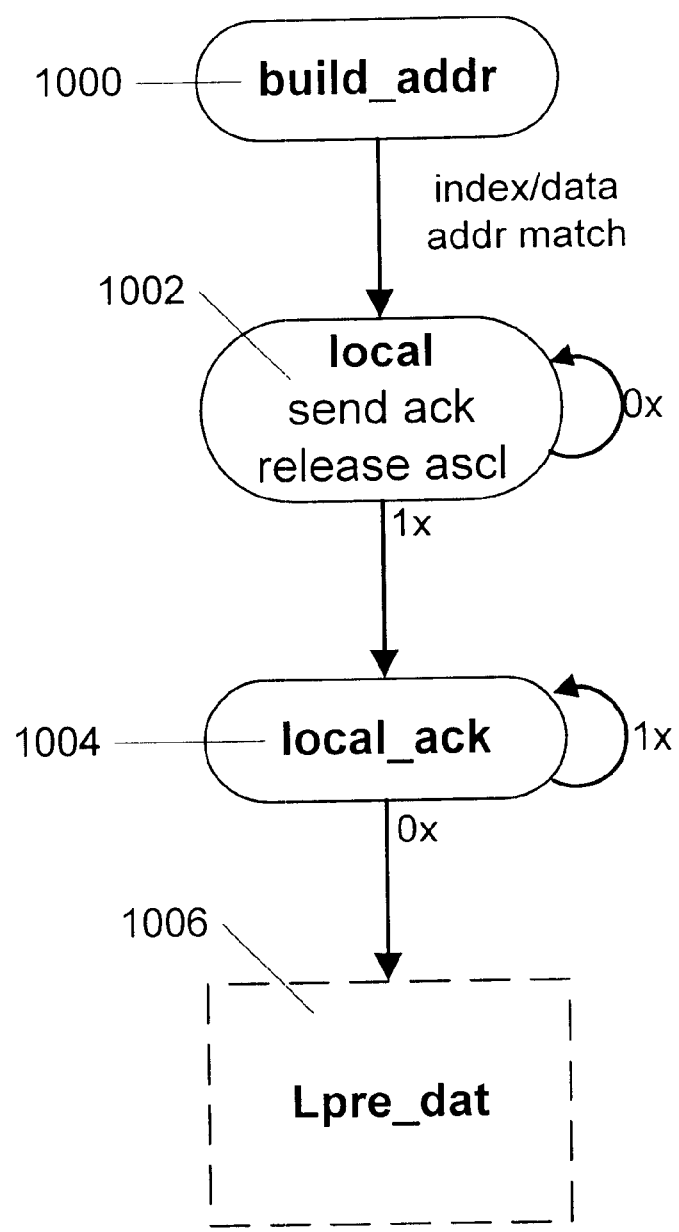
FIGS. 10A, 10B and 10C are state diagrams illustrating the initial, read and write processing, respectively, of data transferred from the port-A master to the registers internal to the microcontroller.
Figure 10B:
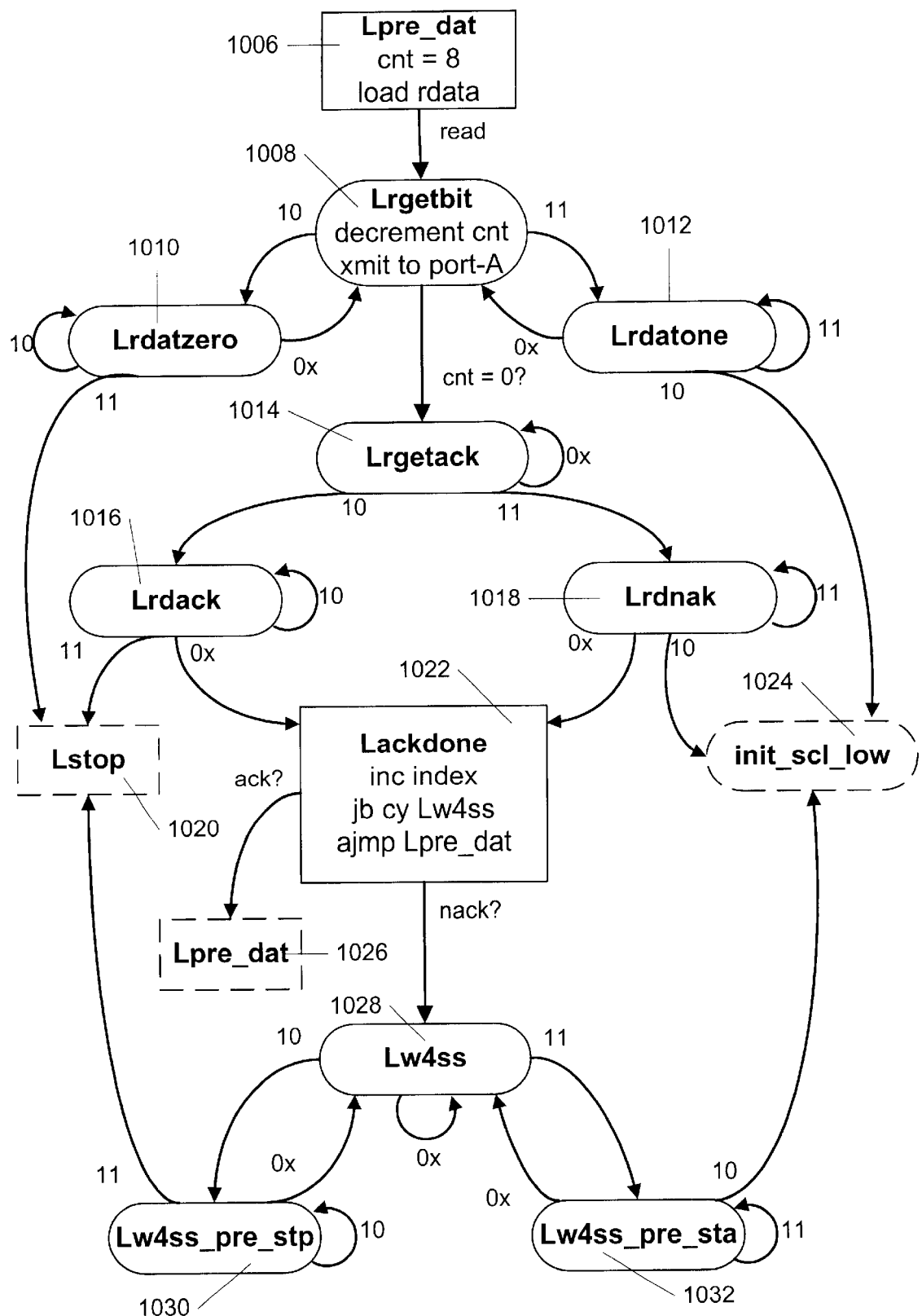
Figure 10C:
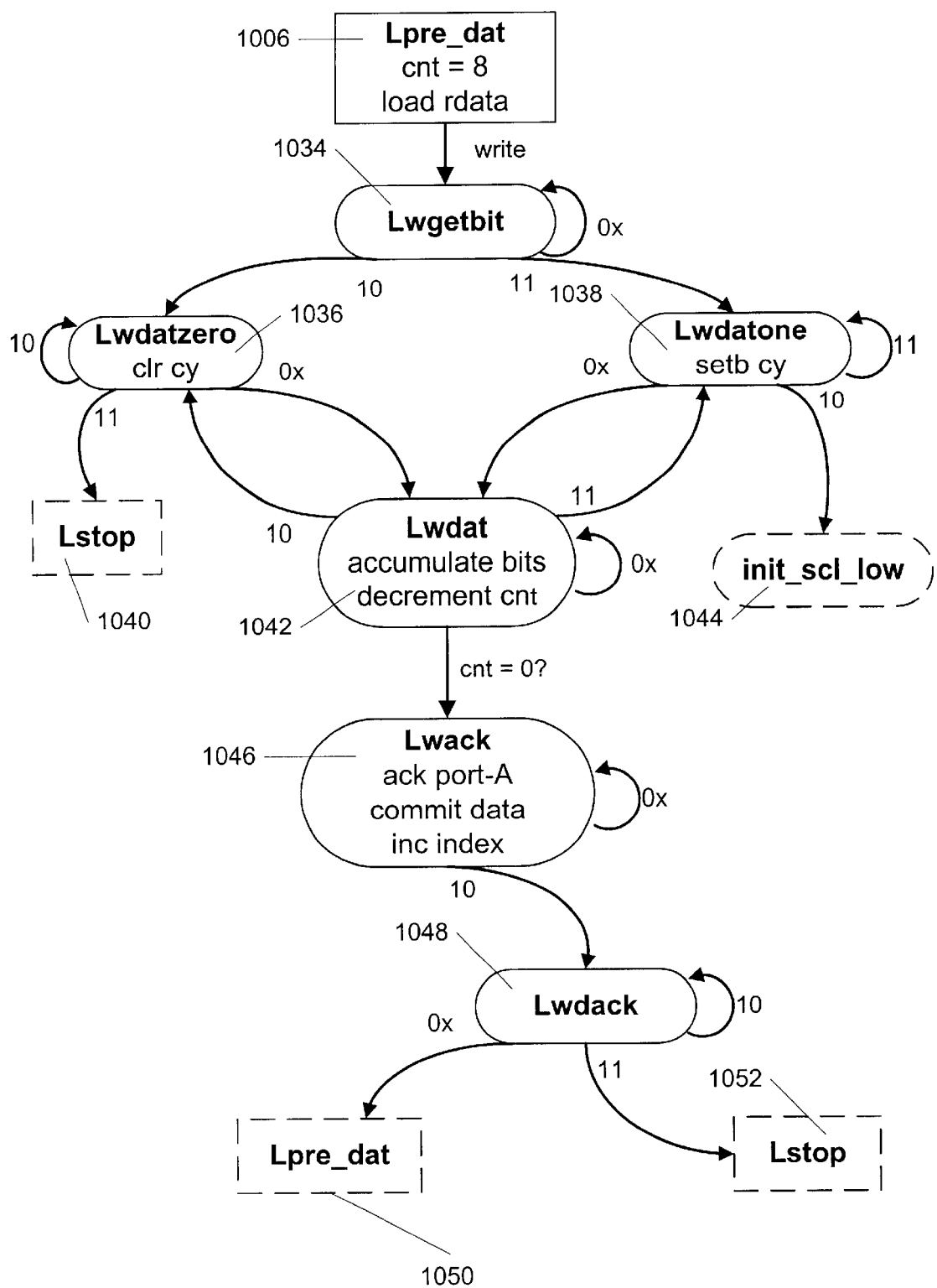

FIGS. 10A–10C show the state flow associated with read and write transactions driven by the port-A master 302 to the internal register array 400. This state flow begins in state 1000 and dispatches to state 1002 when the port-A master generates an address that matches the local index register. In state 1002, the firewall apparatus sends an ACK to the port-A master and releases the port-A SCL line 306. The code dispatches through state 1004 during a HIGH to LOW transition on the SCL line 306 signaling a START condition from the port-A master. Processing of the data sent by the port-A master is carried out starting in processing block 1006 which is described in more detail in FIGS. 10B and 10C, depending on whether the transaction is a read or a write.

In the read flow illustrated in FIG. 10B, in states 1008, 1010 and 1012 data bits are passed from the registers to the port-A bus on a bit-by-bit basis. In particular, in the Lrgetbit state 1008, the code decrements the cnt variable, obtains a bit from the appropriate register and transfers the bit to port-A. The state 1008 then dispatches to either state 1010 or state 1012 depending on whether the bit was a "1" or "0." Operation continues in this manner until the cnt variable reaches zero, at which point the state 1008 dispatches to state 1014 in which the code waits for either an ACK or a NAK from the port-A master 302.

The case of an ACK received is indicated by a dispatch through state 1016 to state 1022. A NAK is indicated by a dispatch through state 1018 to state 1022. Alternatively, if a STOP is received in state 1016, the code flow dispatches to processing block 1020 to process the stop condition. If, in state 1018, a START condition is received, the code flow dispatches to state 1024 to process the START condition. State 1024 is equivalent to state 506 in FIG. 5 and processing continues from there.

In processing block 1022, either an ACK or a NAK has been received from the port-A master 302. The index register 410 is then incremented and preparations are made to respond to a NAK received from the port-a master 302. If an ACK has been received, the code flow dispatches back to state 1026 to process additional data bytes. At the end of a read transaction, the port-A master 302 will send a NAK to the firewall apparatus in response to the reception of the last data byte in order to signal to the firewall apparatus that it should stop driving data on the SDA line. When this occurs, the read transaction is complete, and the code enters a state w4ss 1028 where it simply watches for a START or STOP condition. A START condition is received as indicated by a dispatch to state 1032 and then to state 1024. Alternatively, if a STOP condition is received, the code dispatches to state 1030 and then to a stop block 1020 for processing the stop condition.

In the write data processing flow illustrated in FIG. 10C, in a similar manner to the read processing flow, in states 1034,1036 and 1038, data bits are passed from the port-A I²C bus to the registers 400 on a bit-by-bit basis. In particular, if a "0" is received from the port-A master 302 as indicated by a dispatch through states 1034 and 1036 to state 1042, the code stores the received bit in the carry flag, accumulates the bits and decrements the cnt variable. If a "1" is received from the port-A master 302 as indicated by a dispatch through states 1034 and 1038 to state 1042, the code stores the received bit in the carry flag, accumulates the stored bits and decrements the cnt variable. A STOP condition generated by the port-A master, as indicated by a dispatch through states 1034 and 1036 reaches processing block 1040 which handles the STOP condition. Alternatively, a START condition generated by the port-A master, as indicated by a dispatch through states 1034 and 1038 reaches state 1044 which, as previously described, handles the START condition.

Operation continues in this manner until the cnt variable reaches zero, at which point the state 1042 dispatches to state 1046 in which an ACK signal is sent to the port-A master 302. The accumulated data is then stored in the appropriate register and the index register is decremented. If a STOP is not received, the code prepares to send additional data by dispatching to processing block 1050 (back to block 1006). If a STOP condition is received, the state 1048 dispatches to processing block 1052.

As can be seen in this flow, the index register is incremented after every read data byte following the ACK/NAK bit, and after every write data byte just prior to sending the ACK bit. Thus, successive bytes may be written to or read from the register array without the need to update the index register.

The following three FIGS., 11, 12 and 13, show actual oscilloscope traces of an implementation of a preferred embodiment in operation. In these diagrams, the port-A side of the firewall, shown as the bottom two traces, is connected to a port-A master 302. The port-B side, shown in the top two traces, is connected to the multimaster I²C segment that contains two other masters in the system.

Figure 11:
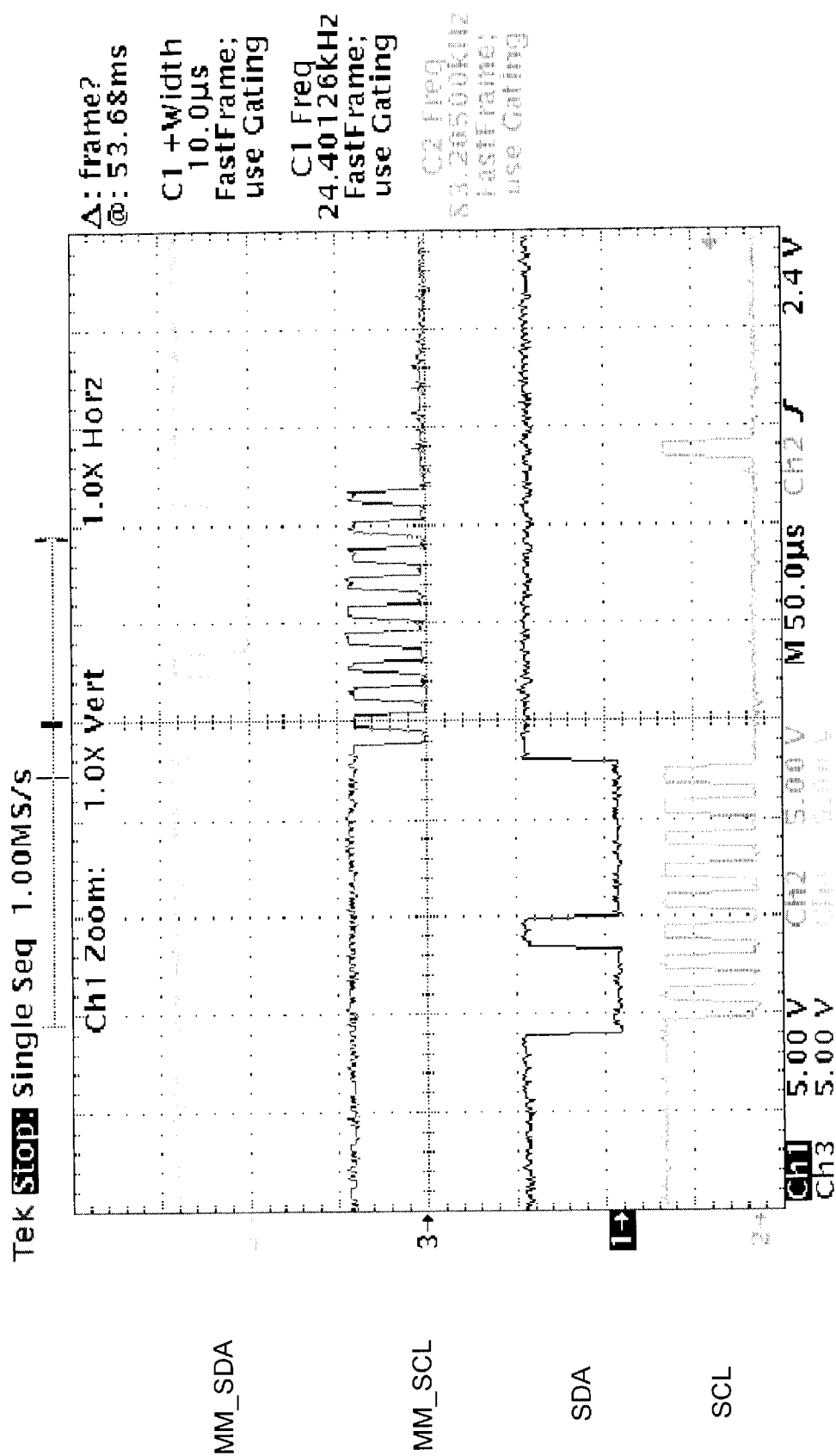
FIG. 11 is a screen shot showing oscilloscope traces that illustrate the initial address phase of a transaction driven by the port-A master.

FIG. 11 shows the initial address phase of a transaction driven by the port-A master 302. In this case, the address driven by port-A master is 20 hex. Prior to the first low-going edge on the SDA line 310, the firewall apparatus state machine remains in the idle state 504 (FIG. 5), waiting for the busy flag to be set. When the SDA line 306 initially goes LOW, an interrupt is generated at the microcontroller 301 as previously described. This interrupt causes control to pass to the interrupt service routine flow shown in FIG. 9. After the port-A master 302 drives the SCL line 306 LOW, the interrupt service routine stalls the transaction by holding SCL line 306 LOW, sets the busy flag, and returns control to the idle state 504. The initial address flow of FIG. 5 then proceeds to consume all seven address bits and the read/write bit before stalling the port-A bus 306, 310.

Next, the firewall apparatus acquires the port-B multi-master bus and re-drives the address on the SDA and SCL lines 312, 316. After ninth clock pulse on the port-B bus, the firewall apparatus passes the NAK bit received on the port-B bus 314 to the port-A bus 308. Note that at this point, the multimaster bus is stalled by the firewall apparatus, while the port-A bus is running, awaiting the system software to service the port-A master to allow the transaction to proceed.

Figure 12:
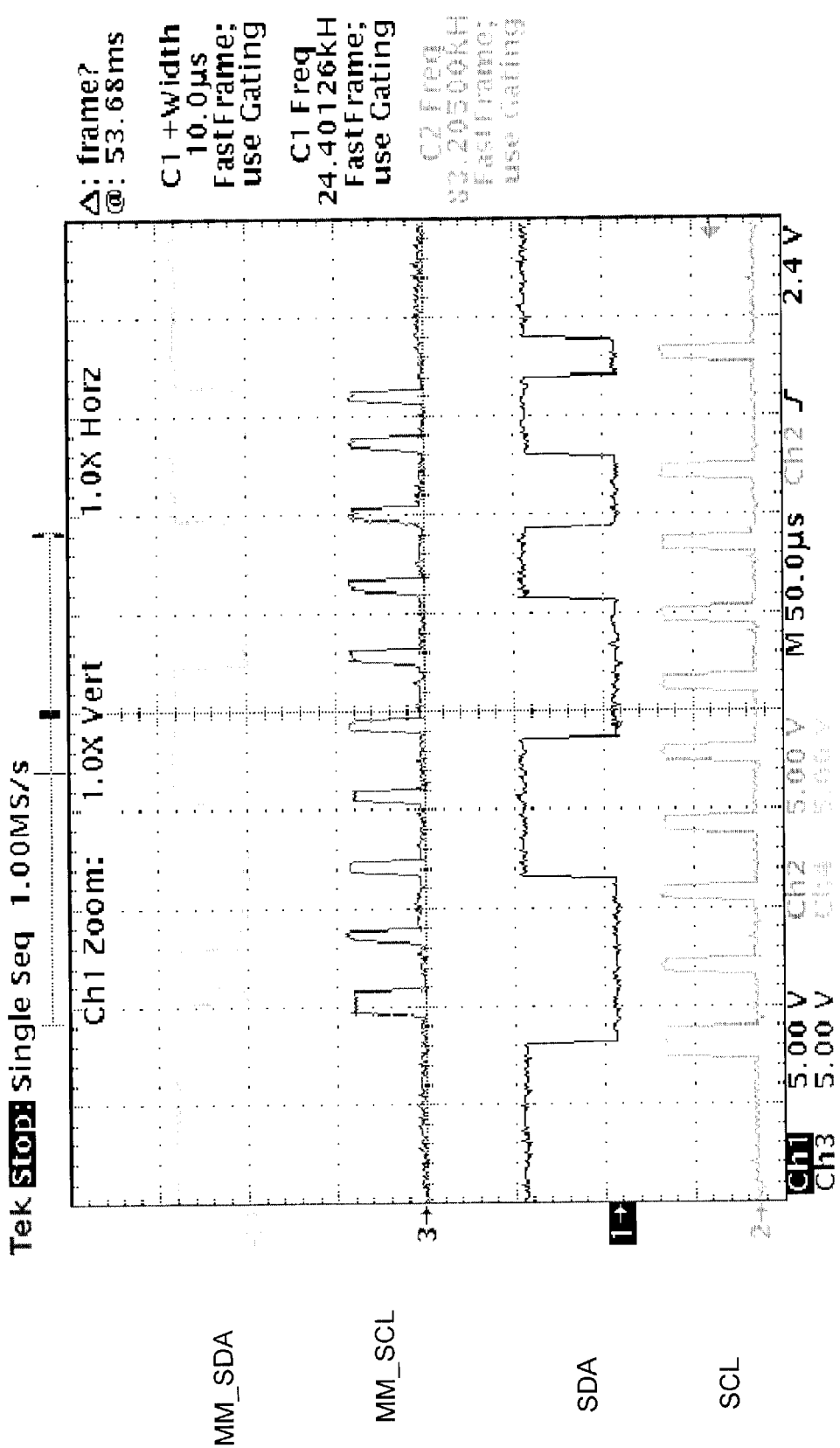
FIG. 12 is a screen shot showing oscilloscope traces that illustrate the operation of the firewall apparatus during a repeated start condition driven by the port-A master.

FIG. 12 shows the operation of the firewall apparatus during a repeated start condition driven by the port-A master 302. In this example, a transaction driven by the port-A master 302 is already in progress and is being passed to the multimaster I²C bus segment 314. At the left of this figure, the port-A master 302 drives a repeated START condition to issue a new address during the current transfer. The firewall apparatus detects this repeated START and passes control to the flow shown in FIG. 7. It can be seen in the flow of FIG. 7 that the address bits following this repeated START condition are passed from port-A 308 to port-B 314 on a bit-by-bit basis. Thus, the latency added to the transaction by the firewall apparatus appears as a stretching of the LOW portions of the port-A and port-B SCL lines, 306 and 312. It is during these LOW times on the SCL lines 306, 312 that the firewall is servicing the other port.

Figure 13:
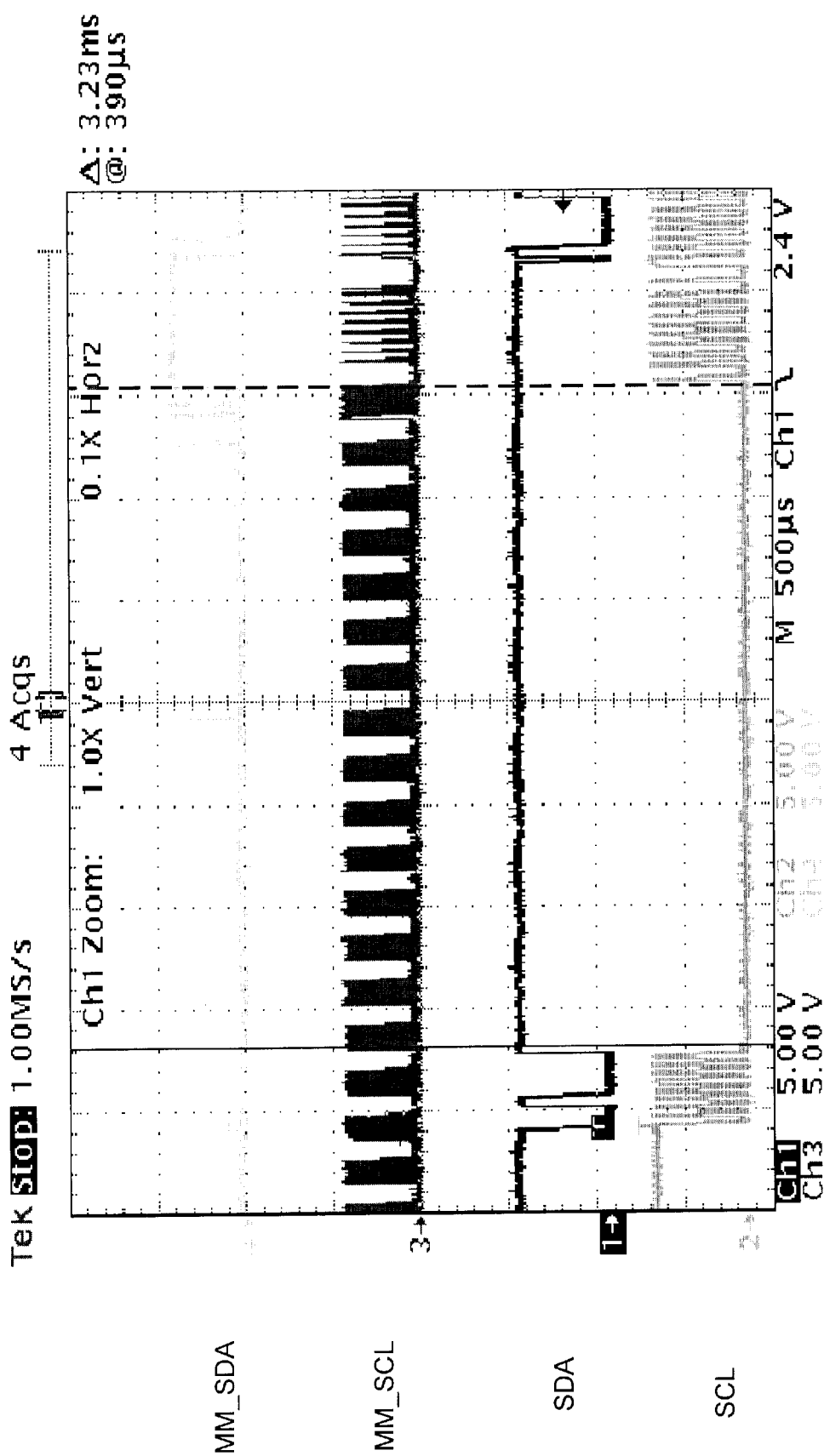
FIG. 13 is a screen shot showing oscilloscope traces that illustrate the operation of firewall apparatus when the port-A master attempts to launch a transaction at a time when the port-B multimaster $I^2C$ bus is busy.

FIG. 13 shows the operation of firewall apparatus when the port-A master attempts to launch a transaction at a time when the port-B multimaster I²C bus is busy. This diagram highlights an important aspect of the invention. As can be seen in FIG. 13, from the signals on the multimaster SDA and SCL lines 312, 316, the port-B bus 314 is already busy with a transaction at the time when the port-A master 302 starts a new transaction. In this case, the transaction in progress on the port-B bus is a 32-byte read of a slave device (not shown) by one of the port-B masters (not shown.) FIG. 13 shows how the firewall apparatus absorbs the address driven by the port-A master 302, and then stalls the transaction on port-A until it is able to successfully acquire and drive the address on the port-B bus 314.

Subsequently, the transaction on port-A is allowed to proceed. Thus, the port-A master 302 is liberated from the burdens of handling collisions or tracking the busy/idle state of the multimaster bus 314. The port-A master simply launches a new transaction, and if the multimaster bus is currently busy, the port-A master 302 is stalled until ownership of the multimaster bus has been acquired.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementation a different microcontroller may be used. Other aspects, such as the specific state flows, as well as other modifications to the inventive concept are intended to be covered by the appended claims

What is claimed is:

1. Apparatus for connecting a single bus master device to a multimaster bus I²C environment, comprising a port-A interface that receives address and data signals from the device and transmits acknowledgement and negative acknowledgement signals to the device;

a port-B interface that transmits address and data signals to the multimaster bus and detects multimaster bus errors in the multimaster bus environment; and a controller that transparently passes address and data signals received on the port-A interface from the device to the port-B interface for transmission on the multimaster bus and controls the port-A interface to transmit a negative acknowledgement signal to the device when an error is detected on the multimaster bus and data and address signals are received from the device.

2. The apparatus according to claim 1 wherein the controller transparently passes data signals received on the port-B interface from the multimaster bus to the port-A interface for transmission to the device when no error are detected on the multimaster bus.

3. The apparatus according to claim 1 wherein the port-B interface comprises a busy mechanism for detecting when the multimaster bus is busy.

4. The apparatus according to claim 3 further comprising a processing mechanism operable when the busy mechanism detects that the multimaster bus is busy for absorbing address signals received from the device and stalling the device until the multimaster bus is not busy.

5. The apparatus according to claim 4 wherein the device is connected to the port-A interface by a clock and data line and wherein the processing mechanism stalls the device by controlling the clock line.

6. The apparatus according to claim 1 wherein the controller comprises a state machine.

7. The apparatus according to claim 6 wherein the state machine comprises a programmed microcontroller.

8. The apparatus according to claim 7 wherein the device is connected to the port-A interface by a clock and data line and the device generates a START signal by controlling the clock and data line and wherein the START signal is detected by the microcontroller by generating an interrupt based on a signal on the data line.

9. The apparatus according to claim 1 further comprising a bus acquisition mechanism operable when the port-A master initiates a transaction that automatically attempts to acquire the multimaster bus a predetermined number of times when the multimaster bus is busy and when arbitration is lost.

10. The apparatus according to claim 1 wherein the port-A interface receives the address and data signals from a serial bus and the port-B interface transmits the address and data signals serially to the multimaster bus.

11. A method for connecting a single bus master device to a multimaster bus I²C environment, comprising (a) detecting multimaster bus errors in the multimaster bus environment;

(b) receiving address and data signals from the device and transmitting the received address and data signals to the multimaster bus when no error is detected on the multimaster bus; and (c) transmitting a negative acknowledgement signal to the device when an error is detected on the multimaster bus and data and address signals are received from the device.

12. The method according to claim 11 further comprising:

(d) transparently transmitting data signals received from the multimaster bus to the device when no error are detected on the multimaster bus.

13. The method according to claim 11 further comprising:

(f) detecting when the multimaster bus is busy.

14. The method according to claim 13 further comprising:

(g) absorbing address signals received from the device when the multimaster bus is busy; and (h) stalling the device until the multimaster bus is not busy.

15. The method according to claim 14 wherein the device generates address and data signals on a clock and data line and wherein step (h) comprises stalling the device by controlling the clock line.

16. The method according to claim 11 wherein steps (a), (b) and (c) are performed by a state machine.

17. The method according to claim 16 wherein the state machine comprises a programmed microcontroller.

18. The method according to claim 17 wherein the device generates a START signal by controlling a clock and data line and wherein the method further comprises detecting the START signal by generating an microcontroller interrupt based on a signal on the data line.

19. The method according to claim 11 further comprising:

(i) in response to the port-A master initiating a transaction, automatically attempting to acquire the multimaster bus a predetermined number of times when the multimaster bus is busy and when arbitration is lost.

20. The method according to claim 11 wherein step (b) comprises receiving the address and data signals from a serial bus and transmitting the address and data signals serially to the multimaster bus.

21. Firewall apparatus for connecting a single bus master device to a multimaster bus I²C environment, comprising a programmable microcontroller having a software controlled port-A interface that receives address and data signals from the device and transmits acknowledgement and negative acknowledgement signals to the device and a hardware-controlled port-B interface that transmits address and data signals to the multimaster bus and detects multimaster bus errors in the multimaster bus environment; and a state machine program running in the microcontroller that transparently passes address and data signals received on the port-A interface from the device to the port-B interface for transmission on the multimaster bus and controls the port-A interface to transmit a negative acknowledgement signal to the device when an error is detected on the multimaster bus and data and address signals are received from the device.

22. The firewall apparatus according to claim 21 wherein the programmable microcontroller has an internal clock which has a clock speed and controls the microcontroller and wherein the state machine program controls the internal clock speed to have a first speed when address and data signals are received on the port-A interface and a second speed when address and data signals are received on the port-B interface.

23. The firewall apparatus according to claim 21 wherein multimaster bus has a busy state and wherein the state machine program detects the multimaster bus busy state and absorbs address signals received from the device and stalls the device until the multimaster bus is not in the busy state.

24. The firewall apparatus according to claim 23 wherein the device generates address and data signals on a clock and data line and wherein the state machine program stalls the device by controlling the clock line.

25. The firewall apparatus according to claim 21 further comprising bus acquisition apparatus operable when the single bus master device initiates a transaction, that automatically attempts to acquire the multimaster bus a predetermined number of times when the multimaster bus is busy and when arbitration is lost.

26. The firewall apparatus according to claim 21 wherein the port-A interface receives the address and data signals from a serial bus and the port-B interface transmits the address and data signals serially to the multimaster bus.

* * * * *